United States Patent
Ishizaki et al.

(10) Patent No.: US 9,081,447 B2
(45) Date of Patent: Jul. 14, 2015

(54) DISPLAY DEVICE WITH TOUCH DETECTION FUNCTION, TOUCH DETECTION DEVICE, AND ELECTRONIC UNIT

(75) Inventors: Koji Ishizaki, Tokyo (JP); Masanobu Ikeda, Aichi (JP); Yasuyuki Matsui, Kanagawa (JP)

(73) Assignee: JAPAN DISPLAY INC., Tokyo (JP)

( * ) Notice: Subject to any disclaimer, the term of this patent is extended or adjusted under 35 U.S.C. 154(b) by 839 days.

(21) Appl. No.: 13/211,393

(22) Filed: Aug. 17, 2011

(65) Prior Publication Data

US 2012/0044203 A1 Feb. 23, 2012

(30) Foreign Application Priority Data

Aug. 23, 2010 (JP) .................................. 2010-186197

(51) Int. Cl.
G06F 3/041 (2006.01)
G06F 3/045 (2006.01)
G06F 3/044 (2006.01)
G02F 1/1333 (2006.01)

(52) U.S. Cl.
CPC ............ *G06F 3/044* (2013.01); *G02F 1/13338* (2013.01); *G06F 3/0412* (2013.01)

(58) Field of Classification Search
CPC .... G06F 3/044; G06F 3/0412; G06F 1/13338
USPC ................................. 345/173, 174; 178/18.06
See application file for complete search history.

(56) References Cited

U.S. PATENT DOCUMENTS

| 2009/0213090 A1 | 8/2009 | Mamba et al. |
| 2009/0273572 A1* | 11/2009 | Edwards et al. ............... 345/173 |
| 2010/0044122 A1* | 2/2010 | Sleeman et al. ........... 178/18.06 |

(Continued)

FOREIGN PATENT DOCUMENTS

| CN | 101571781 A | 11/2009 |
| JP | 2008-129708 | 6/2008 |

(Continued)

OTHER PUBLICATIONS

Japanese Office Action issued in connection with Japanese Patent Application No. 2010-186197 dated Dec. 3, 2013.

(Continued)

*Primary Examiner* — Lun-Yi Lao
*Assistant Examiner* — Ibrahim Khan
(74) *Attorney, Agent, or Firm* — Dentons US LLP

(57) ABSTRACT

A display device with a touch detection function includes a plurality of touch detection electrodes arranged in parallel to extend in one direction, formed with a predetermined electrode pattern including an electrode portion and aperture portions, and each outputting a detection signal based on a change of an electrostatic capacitance in response to an external proximity object, a plurality of display elements formed in a layer different from a layer provided with the touch detection electrodes, and arranged by a predetermined number in a width direction in a region corresponding to the touch detection electrode, and a plurality of dummy electrodes arranged in an inter-detection-electrode region of the plurality of touch detection electrodes. The aperture portions are provided to allow an arrangement area ratio of the touch detection electrode to be almost equal to an arrangement area ratio of the dummy electrodes in the inter-detection-electrode region.

3 Claims, 22 Drawing Sheets

(56) References Cited

U.S. PATENT DOCUMENTS

2010/0065342 A1* 3/2010 Shaikh .................. 178/18.06
2011/0018838 A1* 1/2011 Lee ........................ 345/174

FOREIGN PATENT DOCUMENTS

| JP | 2009-205321 | 9/2009 |
| JP | 2009-271923 | 11/2009 |
| TW | 200944877 | 11/2009 |
| TW | 200949655 A | 12/2009 |
| WO | WO 2009/108758 A2 | 9/2009 |

OTHER PUBLICATIONS

Taiwan Office Examination issued in connection with related Taiwan Patent Application No. 100121672 issued Aug. 25, 2014.
Chinese Office Examination Report issued in connection with related Chinese Patent Application No. 201110235280.0 dated Feb. 28, 2015 with English translation.

* cited by examiner

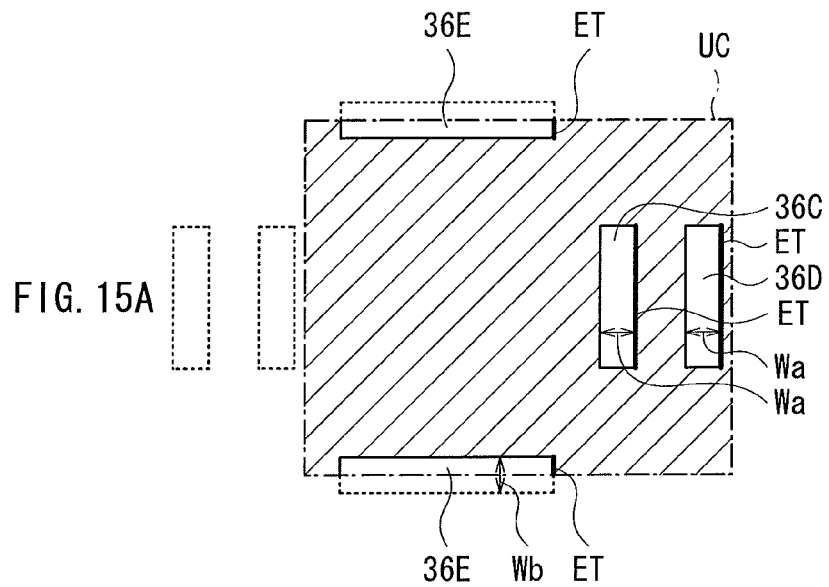
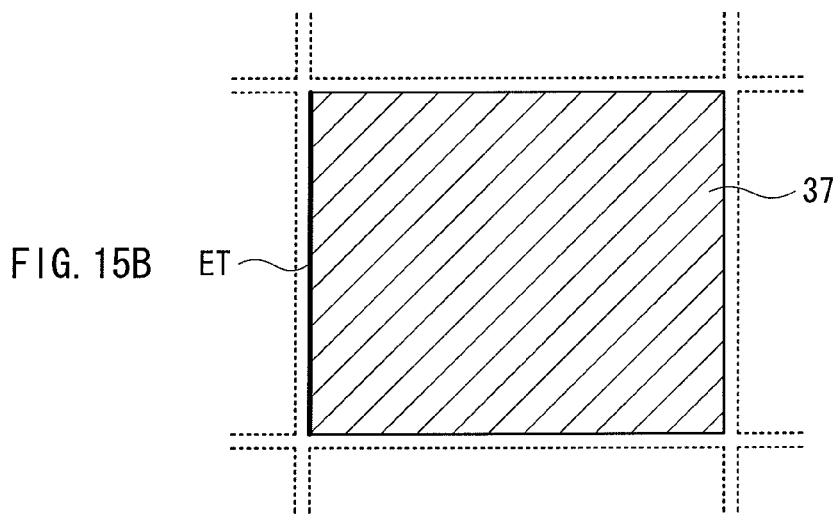

| | ELECTRODE AREA | | | ELECTRODE EDGE LENGTH | | | REFLECTANCE RATIO Rref | REFLECTANCE VISIBILITY | | | | |
|---|---|---|---|---|---|---|---|---|---|---|---|---|
| | APERTURE WIDTH IN TOUCH DETECTION ELECTRODE Wa, Wb | DISTANCE BETWEEN DUMMY ELECTRODES | ELECTRODE AREA RATIO RS | TOUCH DETECTION ELECTRODE | DUMMY ELECTRODE | RATIO OF ELECTORE EDGE LENGTH RLE | | SUN UNDER SUNLIGHT (REGULAR REFLECTION) | SKY UNDER SUNLIGHT (DIFFUSION) | FLUORESCENT LAMP UNDER FLUORESCENT LIGHT (REGULAR REFLECTION) | OTHERS UNDER FLUORESCENT LIGHT (DIFFUSION) | TRANSMISSION VISIBILITY |
| DISPLAY UNIT WITH TOUCH DETECTION FUNCTION 1 | 10.0 | 7.5 | 99.3 | 310 | 360 | 116.1 | 98.5 | BAD | GOOD | ACCEPTABLE | GOOD | GOOD |
| DISPLAY UNIT WITH TOUCH DETECTION FUNCTION 1B | 12.5 | 8.0 | 100.0 | 290 | 358 | 123.4 | 99.9 | BAD | GOOD | ACCEPTABLE | GOOD | GOOD |
| DISPLAY UNIT WITH TOUCH DETECTION FUNCTION 1B | 15.0 | 8.5 | 99.9 | 270 | 356 | 131.9 | 100.5 | BAD | GOOD | ACCEPTABLE | ACCEPTABLE | GOOD |
| DISPLAY UNIT WITH TOUCH DETECTION FUNCTION 5 | 7.0 | 8.0 | 99.6 | 398 | 358 | 90.1 | 97.6 | BAD | GOOD | ACCEPTABLE | GOOD | GOOD |
| DISPLAY UNIT WITH TOUCH DETECTION FUNCTION 5 | 10.0 | 10.0 | 99.9 | 370 | 350 | 94.7 | 99.1 | BAD | GOOD | ACCEPTABLE | GOOD | GOOD |
| DISPLAY UNIT WITH TOUCH DETECTION FUNCTION 5B | 10 | 9.5 | 100.5 | 400 | 352 | 88.0 | 99.6 | BAD | GOOD | ACCEPTABLE | ACCEPTABLE | GOOD |
| DISPLAY UNIT WITH TOUCH DETECTION FUNCTION 5B | 17 | 11.5 | 100.0 | 316 | 344 | 108.9 | 99.8 | BAD | GOOD | ACCEPTABLE | GOOD | GOOD |
| DISPLAY UNIT WITH TOUCH DETECTION FUNCTION 7 | 7 | 10 | 100.2 | 436 | 436 | 100.0 | 98.7 | ACCEPTABLE | GOOD | GOOD | GOOD | GOOD |
| DISPLAY UNIT WITH TOUCH DETECTION FUNCTION 7 | 10 | 12.5 | 99.9 | 400 | 400 | 100.0 | 99.5 | ACCEPTABLE | GOOD | GOOD | GOOD | GOOD |
| DISPLAY UNIT WITH TOUCH DETECTION FUNCTION 7 | 12.5 | 13.5 | 99.8 | 370 | 370 | 100.0 | 99.8 | ACCEPTABLE | GOOD | GOOD | GOOD | GOOD |
| COMPARATIVE EXAMPLE 1 | 7 | 7 | 97.1 | 334 | 362 | 108.4 | 97.1 | BAD | BAD | BAD | ACCEPTABLE | GOOD |
| COMPARATIVE EXAMPLE 2 | 10 | 10 | 93.9 | 310 | 350 | 112.9 | 94.3 | BAD | BAD | BAD | ACCEPTABLE | GOOD |
| COMPARATIVE EXAMPLE 3 | 15 | 15 | 85.8 | 270 | 330 | 122.2 | 93.2 | BAD | BAD | BAD | ACCEPTABLE | GOOD |
| COMPARATIVE EXAMPLE 4 | 30 | 30 | 50.3 | 150 | 270 | 180.0 | 85.4 | BAD | BAD | BAD | BAD | GOOD |

FIG. 19

DISPLAY DEVICE WITH TOUCH DETECTION FUNCTION, TOUCH DETECTION DEVICE, AND ELECTRONIC UNIT

BACKGROUND

This disclosure relates to a touch detection device, in particular, to a touch detection device detecting touch events based on a change of an electrostatic capacitance in response to an external proximity object, a display device with a touch detection function including such a touch detection device, and an electronic unit.

In recent years, a display device capable of inputting information by mounting a contact detection device, which is a so-called touch panel, on a display device such as a liquid crystal display device, or integrating the touch panel and the display device, and displaying various button images and the like on the display device instead of typical mechanical buttons has attracted attention. The display device including such a touch panel does not require input devices such as a keyboard, a mouse, and a keypad, and therefore there is a tendency to expand the use of such a display device to portable information terminals such as mobile phones, in addition to computers.

Some methods are included in the touch detection methods, and one of them is an electrostatic capacitance method. For example, Japanese Unexamined Patent Application Publication No. 2008-129708 discloses a touch panel including a plurality of X-direction electrodes and a plurality of Y-direction electrodes arranged to face the X-direction electrodes, and detecting touch events by using a change of an electrostatic capacitance formed in the intersections of the X-direction electrodes and the Y-direction electrodes in response to an external proximity object. These electrodes are formed of a translucent material, however, light transmittance is different between a portion with the electrode and a portion without the electrode, and therefore, these electrodes are possibly viewed from outside. Accordingly, in the touch panel, dummy electrodes are provided between the X-direction electrodes, or between the Y-direction electrodes to reduce the difference of the light transmittance between the electrode region formed with the X-direction electrodes and the Y-direction electrodes and the inter-electrode region arranged with the dummy electrodes, and therefore the X-direction electrodes and Y-direction electrodes are allowed to be hardly viewed from outside.

SUMMARY

The X-direction electrodes and the Y-direction electrodes are possibly viewed due to not only the above-described light transmission but also, for example, reflection of light incident from outside by the electrodes. However, in Japanese Unexamined Patent Application Publication No. 2008-129708, no description is made as for the reflection. When the X-direction electrodes and the Y-direction electrodes are viewed due to the reflection, visibility of a screen displayed on the display device is possibly lowered.

It is desirable to provide a display device with a touch detection function, a touch detection device, and an electronic unit which are capable of suppressing degradation of visibility of a display screen due to an electrode, even in a case where light enters from outside.

A first display device with a touch detection function according to an embodiment of the disclosure includes a plurality of touch detection electrodes, a plurality of display elements, and a plurality of dummy electrodes. The plurality of touch detection electrodes is arranged in parallel to extend in one direction, is formed with a predetermined electrode pattern including an electrode portion and aperture portions, and each outputs a detection signal based on a change of an electrostatic capacitance in response to an external proximity object. The plurality of display elements is formed in a layer different from a layer provided with the touch detection electrodes, and is arranged by a predetermined number in a width direction in a region corresponding to the touch detection electrode. The plurality of dummy electrodes is arranged in an inter-detection-electrode region of the plurality of touch detection electrodes. The aperture portions are provided to allow an arrangement area ratio of the touch detection electrode to be almost equal to an arrangement area ratio of the dummy electrodes in the inter-detection-electrode region. Herein, the phrase "provided to be almost equal" or "provided to be almost the same" means that both are provided to be close to each other as much as possible, even if both are not completely the same.

A second display device with a touch detection function according to an embodiment of the disclosure includes a plurality of touch detection electrodes, a plurality of display elements, and a plurality of dummy electrodes. The plurality of touch detection electrodes is arranged in parallel to extend in one direction, is formed with a predetermined electrode pattern including an electrode portion and aperture portions, and each outputs a detection signal based on a change of an electrostatic capacitance in response to an external proximity object. The plurality of display elements is formed in a layer different from a layer provided with the touch detection electrodes, and is arranged by a predetermined number in a width direction in a region corresponding to the touch detection electrode. The plurality of dummy electrodes is arranged in an inter-detection-electrode region of the plurality of touch detection electrodes. The aperture portions are arranged to allow a total length of all sides of the aperture portions per unit area to be almost equal to a total length of all sides of the dummy electrode per unit area.

A touch detection device according to an embodiment of the disclosure includes a plurality of touch detection electrodes and a plurality of dummy electrodes. The plurality of touch detection electrodes is arranged in parallel to extend in one direction, is formed with a predetermined electrode pattern including an electrode portion and aperture portions, and each outputs a detection signal based on a change of an electrostatic capacitance in response to an external proximity object. The plurality of dummy electrodes is arranged in an inter-detection-electrode region of the plurality of touch detection electrodes. The aperture portions are provided to allow an arrangement area ratio of the touch detection electrode to be almost equal to an arrangement area ratio of the dummy electrodes in the inter-detection-electrode region.

An electronic unit according to an embodiment of the disclosure includes the display device with a touch detection function, and corresponds to a television device, a digital camera, a personal computer, a video camera, or a portable terminal device such as a mobile phone.

In the first display device with a touch detection function, the touch detection device, and the electronic unit according to the embodiments of the disclosure, the arrangement area ratio of the touch detection electrode and the arrangement area ratio of the dummy electrodes in the inter-detection-electrode region are almost equal to each other by the aperture portions provided in the touch detection electrode. Therefore, when light enters from outside, reflectance is almost the same between the touch detection electrode and the inter-detection-electrode region.

In the second display device with a touch detection function according to the embodiment of the disclosure, by the aperture portions provided in the touch detection electrode, the total length of all sides of the aperture portions per unit area is almost equal to the total length of the all sides of the dummy electrode per unit area. Therefore, when light enters from outside, reflectance is almost the same between the touch detection electrode and the inter-detection-electrode region.

In the first display device with a touch detection function according to the embodiment of the disclosure, for example, the aperture portions are desirably provided so that the total length of all sides of the aperture portions per unit area is almost equal to the total length of all sides of the dummy electrode per unit area.

For example, the touch detection electrode is desirably configured of a plurality of detection electrode unit cells each including the aperture portions, and the inter-detection-electrode region is desirably configured of a plurality of dummy electrode unit cells each including the dummy electrode. For example, the size of each of the detection electrode unit cell and the dummy electrode unit cell is desirably equal to or smaller than 500 µm square. For example, the size of the detection electrode unit cell may correspond to the size of the dummy electrode unit cell. For example, the detection electrode unit cell and the dummy electrode unit cell are arranged in positions corresponding to the individual display elements.

The display element may configure a display pixel including at least a red display element, a green display element, and a blue display element, and the size of the detection electrode unit cell may correspond to the size of the display pixel or an integral multiple of the size of the display pixel. Moreover, for example, the size of the dummy electrode unit cell may correspond to the size of the display pixel or an integral multiple of the size of the display pixel.

The aperture portions may be arranged, for example, at least in positions corresponding to a display element for color light with lowest transmittance with respect to the electrode portion, out of the red display element, the green display element, and the blue display element. In this case, for example, the aperture portions may be arranged in a position corresponding to the blue display element. In addition, the dummy electrodes may be arranged so that, out of the gaps between the adjacent dummy electrodes, the position of a gap extending in a direction intersecting an arrangement direction of the red display element, the green display element, and the blue display element corresponds to the position of the blue display element.

For example, a selection line may be further provided for selecting a display element performing display operation, and the aperture portions may be arranged in a position corresponding to the selection line.

For example, the touch detection electrode may be formed directly on a glass substrate for supporting. Moreover, for example, the touch detection electrode is formed on the glass substrate for supporting through a light transmitting layer, or is formed between the glass substrate and the light transmitting layer, and the refractive index of the light transmitting layer may have a value between a refractive index of the glass substrate and a refractive index of the touch detection electrode.

Furthermore, the dummy electrodes may be in an electrical floating state.

For example, a plurality of drive electrodes may be arranged in parallel to extend in a direction intersecting the plurality of touch detection electrodes, and an electrostatic capacitance may be formed in each intersection between the plurality of touch detection electrodes and the plurality of drive electrodes.

For example, the display element may be configured to include a liquid crystal layer and pixel electrodes arranged to face the drive electrodes with the liquid crystal layer in between, or may be configured to include a liquid crystal layer and pixel electrodes formed between the liquid crystal layer and the drive electrodes. In this case, the display element may be configured, for example, to be sandwiched between two polarizing plates which are configured of a circularly polarizing plate or an elliptical polarizing plate.

In the first display device with a touch detection function, the touch detection device, and the electronic unit according to the embodiments of the disclosure, the aperture portions are provided in the touch detection electrode, and the arrangement area ratio of the touch detection electrode is almost equal to the arrangement area ratio of the dummy electrodes in the inter-detection-electrode region. Therefore, the reflectance is almost the same between the touch detection electrode and the dummy electrode so that degradation of visibility of the display screen due to the touch detection electrodes is suppressed even in a case where light enters from outside.

Moreover, in the second display device with a touch detection function according to the embodiment of the disclosure, the aperture portions are provided in the touch detection electrode, and the total length of all sides of the aperture portions per unit area is almost equal to the total length of the all sides of the dummy electrode per unit area. Therefore, the reflectance is almost the same between the touch detection electrode and the dummy electrode so that degradation of visibility of the display screen due to the touch detection electrode is suppressed even in a case where light enters from outside.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 15A and 15B are plane views for explaining a vertical electrode edge length according to the second embodiment.

FIG. 19 is a table illustrating example according to the embodiment.

DETAILED DESCRIPTION

Hereinafter, preferred embodiments of the disclosure will be described in detail with reference to drawings. The description will be given in the following order.

1. Basic principle of electrostatic capacitance type touch detection
2. First embodiment
3. Second embodiment
4. Third embodiment
5. Example
6. Application examples 1. Basic Principle of Electrostatic Capacitance Type Touch Detection First, a basic principle of touch detection in a display device with a touch detection function according to embodiments of the disclosure will be described with reference to FIG. 1 to FIG. 3. The touch detection method is implemented as an electrostatic capacitance type touch sensor, and a capacitance element is configured with use of a pair of electrodes (a drive electrode E1 and a touch detection electrode E2) facing to each other with a dielectric body D in between as illustrated in (A) of FIG. 1. The configuration is represented as an equivalent circuit illustrated in (B) of FIG. 1. A capacitance element C1 is configured of the drive electrode E1, the touch detection electrode E2, and the dielectric body D. One end of the capacitance element C1 is connected to an alternating signal source (a drive signal source) S, and the other end P is grounded through a resistor R and is connected to a voltage detector (a touch detection circuit) DET. When an alternating rectangular wave Sg ((B) of FIG. 3) with a predetermined frequency (for example, several kHz to several tens kHz) is applied to the drive electrode E1 (one end of the capacitance element C1) from the alternating signal source S, an output waveform (a touch detection signal Vdet) illustrated in (A) of FIG. 3 appears in the touch detection electrode E2 (the other end P of the capacitance element C1). Note that the alternating rectangular wave Sg corresponds to a drive signal Vcom described later.

Figure 1:
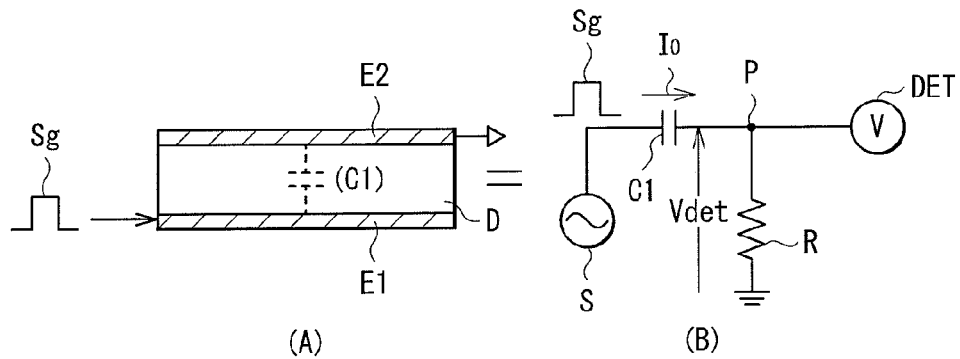
FIG. 1 is a diagram for explaining a basic principle of a touch detection method in a display device with a touch detection function according to embodiments of the disclosure, and a diagram illustrating a state where a finger is not in contact with or not in proximity to the display device.

In a state where a finger is not in contact with (or not in proximity to) the display device, as illustrated in FIG. 1, a current I0 according to the capacitance value of the capacitance element C1 flows in response to charge and discharge with respect to the capacitance element C1. The other end P of the capacitance element C1 at this time has a potential waveform like a waveform V0 in (A) of FIG. 3, and the waveform is detected by the voltage detector DET.

Figure 2:
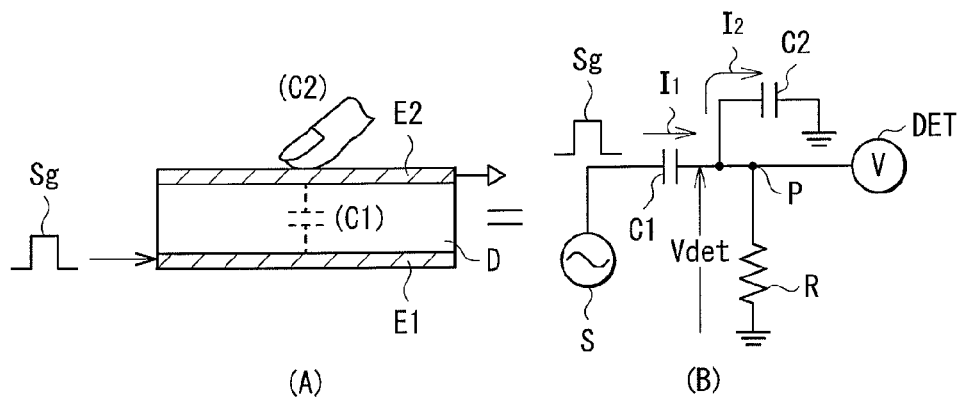
FIG. 2 is a diagram for explaining the basic principle of the touch detection method in the display device with a touch detection function according to the embodiments, and a diagram illustrating a state where a finger is in contact with or in proximity to the display device.
Figure 3:
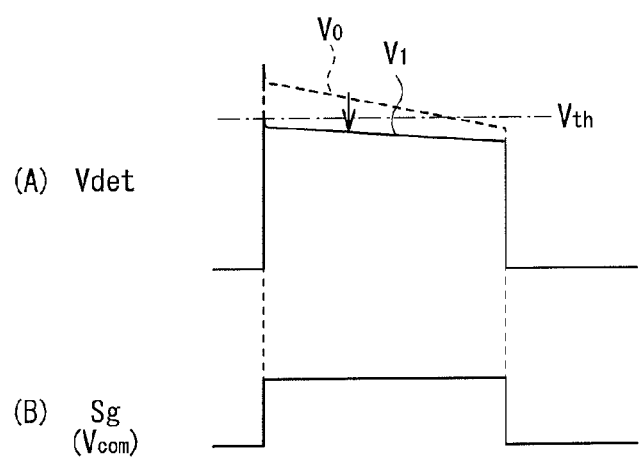
FIG. 3 is a diagram for explaining the basic principle of the touch detection method in the display device with a touch detection function according to the embodiments, and a diagram illustrating an example of a waveform of a drive signal and a touch detection signal.

On the other hand, in a state where a finger is in contact with (or in proximity to) the display device, as illustrated in FIG. 2, a capacitance element C2 formed by the finger is added in series with the capacitance element C1. In this state, currents I1 and I2 flow in response to charge and discharge with respect to the capacitance elements C1 and C2, respectively. The other end P of the capacitance element C1 at this time has a potential waveform like a waveform V1 in (A) of FIG. 3, and the waveform is detected by the voltage detector DET. At this time, the potential of the point P is a partial potential determined by values of the currents I1 and I2 flowing through the capacitance elements C1 and C2. Therefore, the waveform V1 is a smaller value than that of the waveform V0 in a non-contact state. The voltage detector DET compares the detected voltage with a predetermined threshold voltage Vth to determine the non-contact state when the detected voltage is equal to or larger than the threshold voltage, and to determine a contact state when the detected voltage is smaller than the threshold voltage. In such a way, touch detection is achievable.

2. First Embodiment

Configuration Example

General Configuration Example

Figure 4:
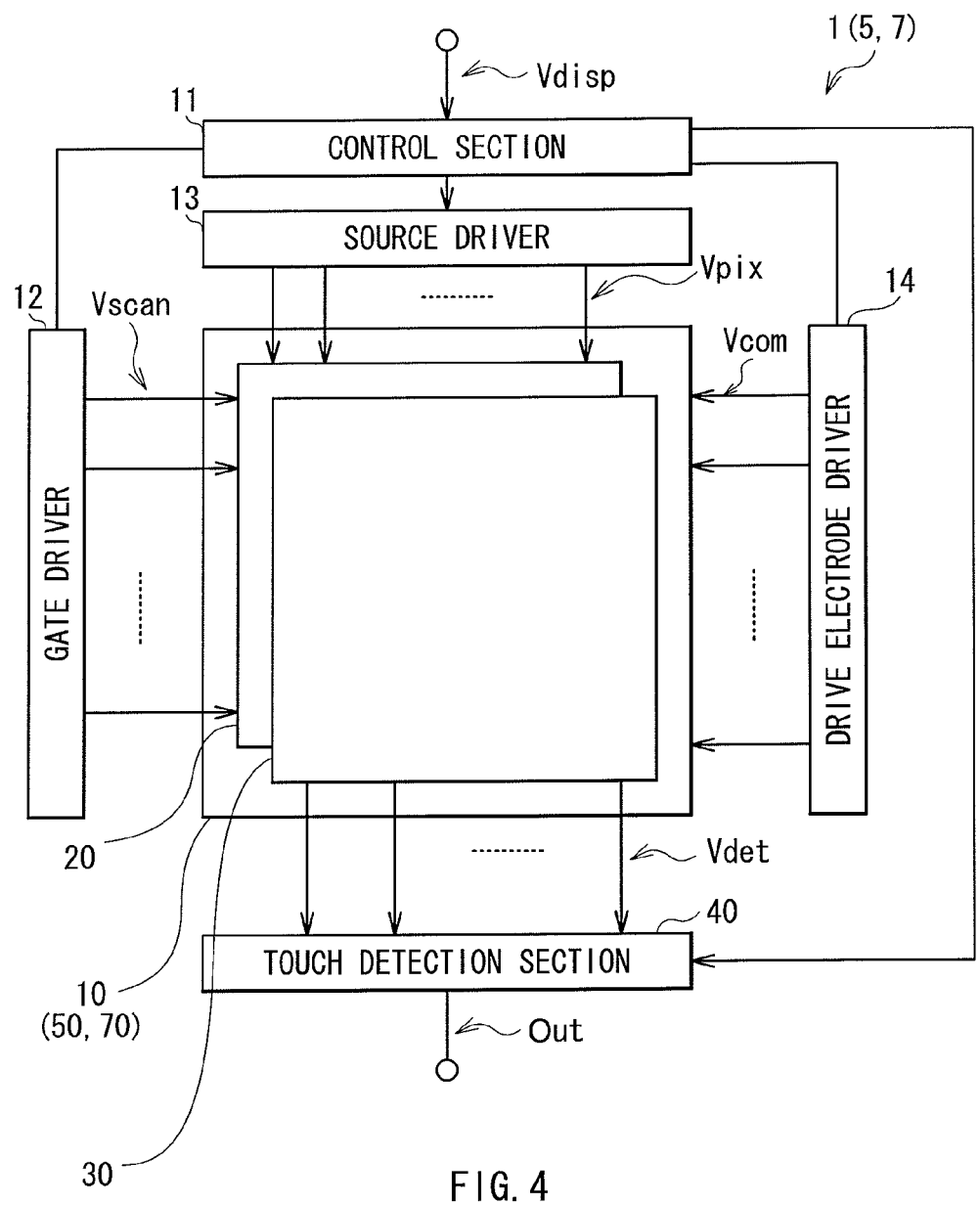
FIG. 4 is a block diagram illustrating a configuration example of a display device with a touch detection function according to the embodiments.

FIG. 4 illustrates a configuration example of a display device with a touch detection function 1 according to a first embodiment of the disclosure. Incidentally, a touch detection device according to the embodiment of the disclosure is implemented by the first embodiment, so the description thereof will be given together. The display device with a touch detection function uses a liquid crystal display element as a display element, and is of a so-called in-cell type in which a liquid crystal display section configured by the liquid crystal display element, and an electrostatic capacitance type touch detection section are integrated.

The display device with a touch detection function 1 includes a control section 11, a gate driver 12, a source driver 13, a drive electrode driver 14, a display section with a touch detection function 10, and a touch detection circuit 40.

The control section 11 is a circuit supplying a control signal to the gate driver 12, the source driver 13, the drive electrode driver 14, and the touch detection circuit 40 based on a picture signal Vdisp supplied from outside, and controlling these parts to operate in synchronization with one another.

The gate driver 12 has a function to sequentially select one horizontal line which is a target of display drive of the display section with a touch detection function 10, based on the control signal supplied from the control section 11. Specifically, as described later, the gate driver 12 applies a scan signal Vscan to a gate of a TFT element Tr of a pixel Pix through a scan signal line GCL to sequentially select, as a target of display drive, one row (one horizontal line) in the pixels Pix formed in a matrix in a liquid crystal display section 20 of the display section with a touch detection function 10.

The source driver 13 is a circuit supplying a pixel signal Vpix to each pixel Pix (described later) in the display section with a touch detection function 10 based on the control signal supplied from the control section 11. Specifically, the source driver 13 supplies the pixel signal Vpix to each pixel Pix configuring one horizontal line sequentially selected by the gate driver 12 through a pixel signal line SGL as described later. Then, in the pixels Pix, display for the horizontal line is performed in response to the supplied pixel signal Vpix.

The drive electrode driver 14 is a circuit supplying a drive signal Vcom to drive electrodes COML (described later) of the display section with a touch detection function 10 based on the control signal supplied from the control section 11. Specifically, the drive electrode driver 14 sequentially applies the drive signal Vcom to the drive electrodes COML in a time-divisional manner. Then, a touch detection section 30 outputs a touch detection signal Vdet based on the drive signal Vcom from a plurality of touch detection electrodes TDL (described later), and supplies the signal to the touch detection circuit 40.

The display section with a touch detection function 10 is a display section incorporating a touch detection function. The display section with a touch detection function 10 includes the liquid crystal display section 20 and the touch detection section 30. As described later, the liquid crystal display section 20 is a section performing sequential scan on one horizontal line basis to perform display according to the scan signal Vscan supplied from the gate driver 12. The touch detection section 30 operates based on the above-described basic principle of the electrostatic capacitance type touch detection, and outputs the touch detection signal Vdet. As described later, the touch detection section 30 performs sequential scan according to the drive signal Vcom supplied from the drive electrode driver 14 to perform touch detection.

The touch detection circuit 40 is a circuit detecting the presence of touch events with respect to the touch detection section 30 based on the control signal supplied from the control section 11 and the touch detection signal Vdet supplied from the touch detection section 30 of the display section with a touch detection function 10, and when the touch event is detected, the touch detection circuit 40 determines the coordinate and the like in a touch detection region to output the coordinate and the like as an output signal Out.

Display Section with a Touch Detection Function 10

Next, the configuration example of the display section with a touch detection function 10 will be described in detail.

Figure 5:
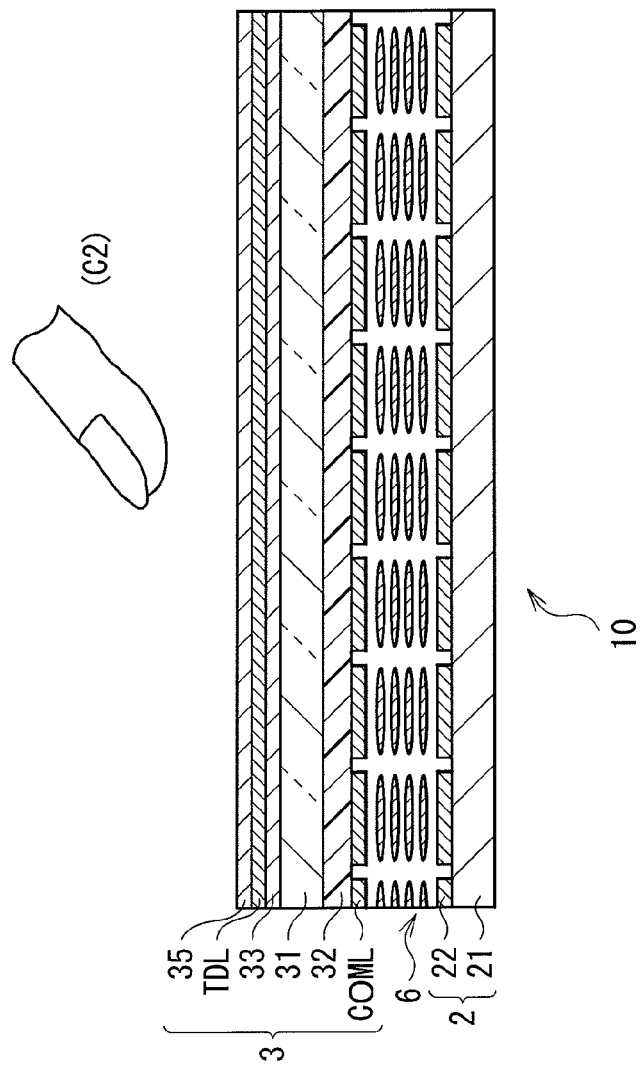
FIG. 5 is a sectional view illustrating a schematic cross-sectional configuration of a display section with a touch detection function according to the embodiments.

FIG. 5 illustrates an example of a cross-sectional configuration of a relevant part of the display section with a touch detection function 10. The display section with a touch detection function 10 has a pixel substrate 2, a facing substrate 3 disposed to face the pixel substrate 2, and a liquid crystal layer 6 inserted between the pixel substrate 2 and the facing substrate 3.

The pixel substrate 2 includes a TFT substrate 21 as a circuit substrate and a plurality of pixel electrodes 22 arranged in a matrix on the TFT substrate 21. In the TFT substrate 21, although not illustrated, thin film transistors (TFTs) for each pixels, and wires such as the pixel signal line SGL for supplying the pixel signal Vpix to each of the pixel electrodes 22, and the scan signal line GCL for driving each TFT are formed.

The facing substrate 3 includes a glass substrate 31, a color filter 32 formed on a surface of the glass substrate 31, and a plurality of drive electrodes COML formed on the color filter 32. The color filter 32 is configured by cyclically arranging three color filter layers of red (R), green (G), and blue (B), and a set of three colors of R, G, and B corresponds to each display pixel. The drive electrodes COML function as common drive electrodes for the liquid crystal display section 20, and function as drive electrodes for the touch detection section 30. Note that in this example, although the drive electrodes are shared for display and for touch detection, the drive electrodes for display and for touch detection may be separately provided. The drive electrodes COML are connected to the TFT substrate 21 by a contact conducting cylinder (not illustrated), and the drive signal Vcom with the alternating rectangular waveform is applied from the TFT substrate 21 to the drive electrodes COML through the contact conducting cylinder. A light transmitting layer 33 is formed on the other surface of the glass substrate 31, and touch detection electrodes TDL as detection electrodes of the touch detection section 30 are formed on the light transmitting layer 33. Each of the touch detection electrodes TDL is composed of, for example, ITO (indium tin oxide), IZO, and SnO, and is an electrode with translucency. Each of the touch detection electrodes TDL has a plurality of aperture portions as described later. The light transmitting layer 33 is composed of an insulating material such as SiN and SiC, and the refractive index thereof is a value (for example, approximately 1.75 in the case of SiN, and approximately 1.6 in the case of SiC) between the refractive index (for example, approximately 1.5) of the glass substrate 31 and the refractive index (for example, approximately 1.8) of the touch detection electrodes TDL in the vicinity of the wavelength 550 nm with high visibility. The light transmitting layer 33 is provided as an index matching layer for reducing reflection between the glass substrate 31 and the touch detection electrodes TDL. Moreover, on the touch detection electrode TDL, a polarizing plate 35 is disposed.

The liquid crystal layer 6 modulates light passing therethrough according to a state of electric field, and liquid crystal of various modes such as TN (twisted nematic), VA (vertical alignment), and ECB (electrically controlled birefringence) is used.

Incidentally, an alignment film is disposed between the liquid crystal layer 6 and the pixel substrate 2, and between the liquid crystal layer 6 and the facing substrate 3, which is not illustrated in the figure. In addition, an incident-side polarizing plate is disposed on a bottom surface side of the pixel substrate 2, which is not illustrated in the figure. As the polarizing plate 35 and the incident-side polarizing plate (not illustrated), a circularly polarizing plate or an elliptical polarizing plate is used.

Figure 6A:
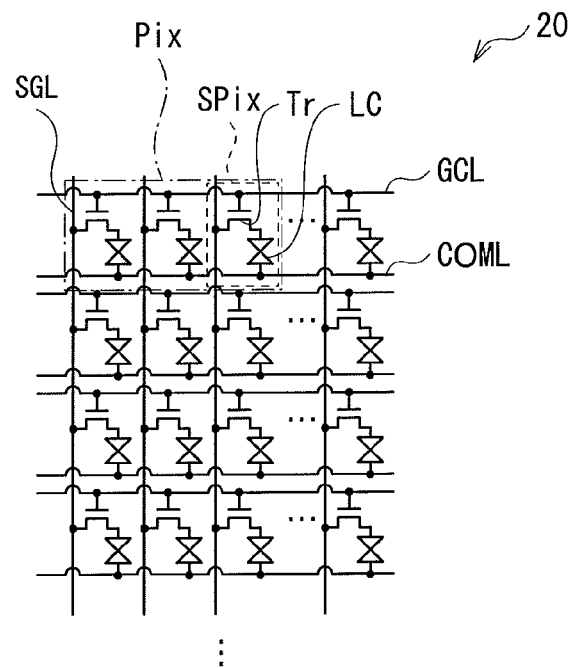
FIGS. 6A and 6B are a circuit diagram and a plane view, respectively, both illustrating a pixel arrangement of the display section with a touch detection function according to the embodiments.
Figure 6B:
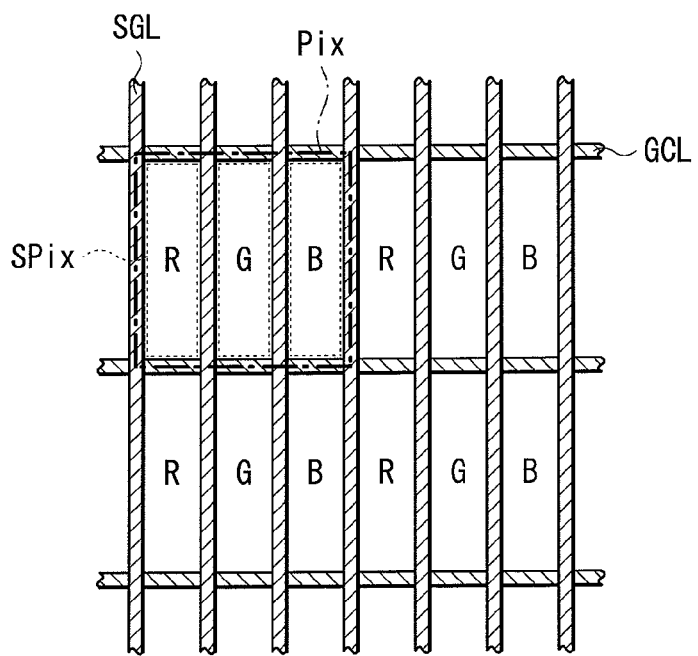

FIGS. 6A and 6B illustrate a configuration example of a pixel configuration in the liquid crystal display section 20, where FIG. 6A is a circuit diagram thereof, and FIG. 6B is a plane view thereof. The liquid crystal display section 20 has the plurality of pixels Pix arranged in a matrix. Each pixel Pix is configured of three sub-pixels SPix. The three sub-pixels SPix are arranged to correspond to three colors (RGB) of the color filter 32 illustrated in FIG. 5, respectively. Each of the sub-pixels SPix has a TFT element Tr and a liquid crystal element LC. The TFT element Tr is configured of a thin film transistor, and in this example, the TFT element Tr is configured of an n-channel MOS (metal oxide semiconductor) TFT. A source of the TFT element Tr is connected to the pixel signal line SGL, a gate thereof is connected to the scan signal line GCL, and a drain thereof is connected to one end of the liquid crystal element LC. One end of the liquid crystal element LC is connected to the drain of the TFT element Tr, and the other end thereof is connected to the drive electrode COML.

Each of the sub-pixels SPix is connected, with respect to each other, by the scan signal line GCL, to the other sub-pixels SPix which are in the same row of the liquid crystal display section 20. The scan signal line GCL is connected to the gate driver 12, and the scan signal Vscan is supplied from the gate driver 12. In addition, each of the sub-pixels SPix is connected, with respect to each other, by the pixel signal line SGL, to the other sub-pixels SPix which are in the same column of the liquid crystal display section 20. The pixel signal line SGL is connected to the source driver 13, and the pixel signal Vpix is supplied from the source driver 13.

The pixel signal line SGL and the scan signal line GCL are arranged in a boundary between the adjacent sub-pixels SPix as illustrated in FIG. 6B. Specifically, the pixel signal line SGL is arranged in a boundary between the laterally adjacent sub-pixels SPix, and the scan signal line GCL is arranged in a boundary between the vertically adjacent sub-pixels SPix. The pixel signal line SGL and the scan signal line GCL are configured of a single-layer film or a multilayer film of aluminum, aluminum alloy, molybdenum, and titanium, for example. Therefore, light is not transmitted in a portion corresponding to the pixel signal line SGL and/or the scan signal line GCL.

In addition, each of the sub-pixels Spix is connected, with respect to each other, to the other sub-pixels SPix which are in the same row of the liquid crystal display section 20 by the drive electrodes COML. The drive electrodes COML are connected to the drive electrode driver 14, and the drive signal Vcom is supplied from the drive electrode driver 14.

With this configuration, in the liquid crystal display section 20, the gate driver 12 drives the scan signal line GCL to perform line-sequential scan in a time-divisional manner so that one horizontal line is sequentially selected. Then, the source driver 13 supplies the pixel signal Vpix to the pixels Pix in the selected horizontal line to perform display on one horizontal line basis.

Figure 7:
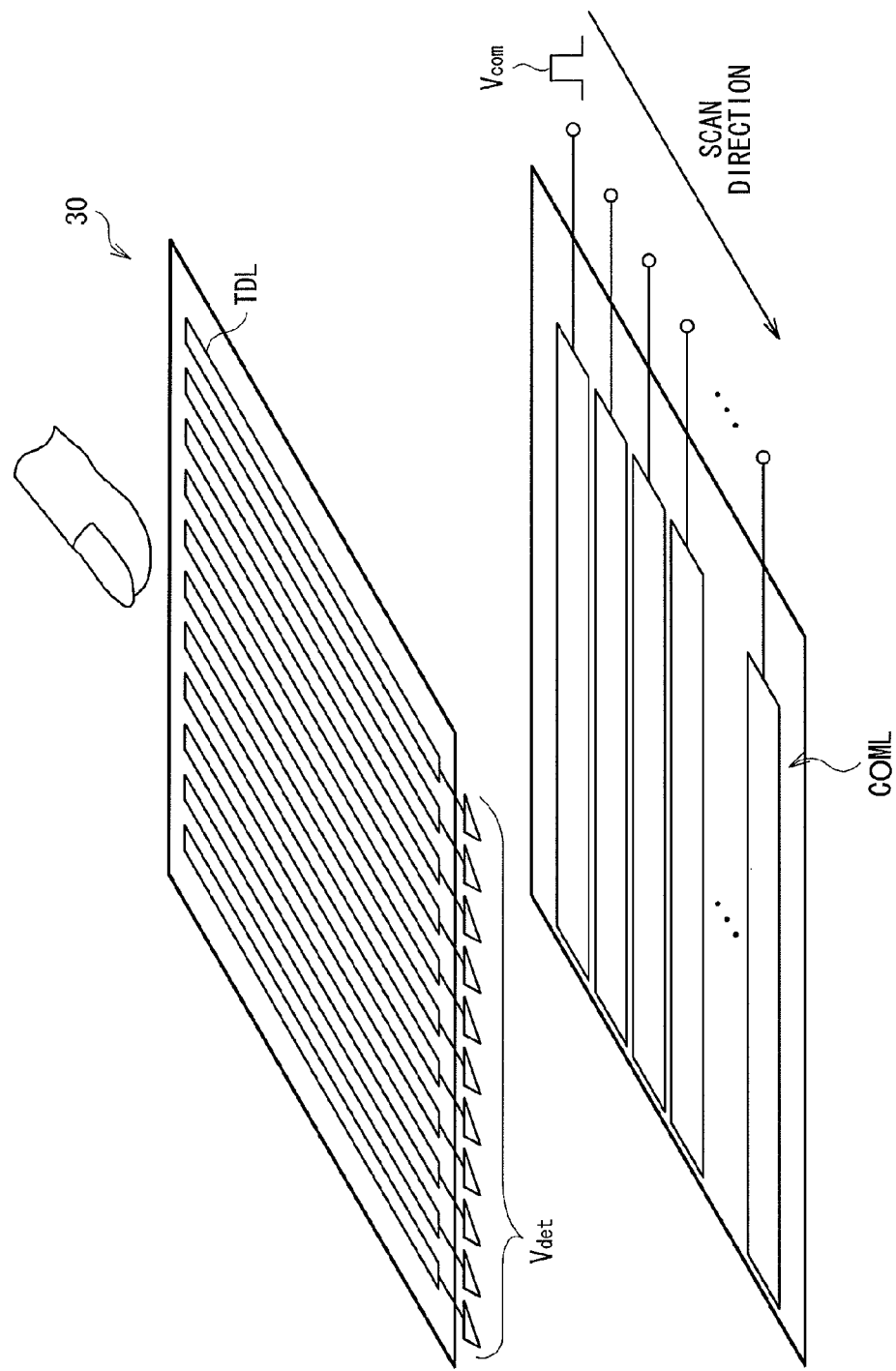
FIG. 7 is a perspective view illustrating a configuration example of drive electrodes and touch detection electrodes of the display section with a touch detection function according to the embodiments.

FIG. 7 is a perspective view illustrating a configuration example of the touch detection section 30. The touch detection section 30 is configured of the drive electrodes COML and the touch detection electrodes TDL arranged in the facing substrate 3. Each of the drive electrodes COML is configured of a stripe-shaped electrode pattern extending in a lateral direction of the figure. When a touch detection operation is performed, the drive signal Vcom is sequentially supplied to each of the electrode patterns by the drive electrode driver 14, and sequential scan drive is performed in a time-divisional manner. Each of the touch detection electrodes TDL is configured of an electrode pattern extending in a direction intersecting with an extending direction of the electrode pattern of each of the drive electrode COML. As described later, dummy electrodes 37 (not illustrated) are arranged between the touch detection electrodes TDL (an inter-detection-electrode region). Each of the touch detection electrodes TDL includes an electrode pattern including the plurality of aperture portions which is provided for adjusting the reflectance of the touch detection electrodes TDL and the reflectance of the dummy electrodes 37 to be equal to each other. The electrode pattern of each of the touch detection electrodes TDL is connected to the touch detection circuit 40. The electrode patterns of the drive electrode COML and the electrode patterns of the touch detection electrodes TDL intersecting with each other form an electrostatic capacitance at each intersection.

With this configuration, in the touch detection section 30, the drive electrode driver 14 applies the drive signal Vcom to the drive electrodes COML to output the touch detection signal Vdet from the touch detection electrodes TDL, and therefore touch detection is performed. The drive electrodes COML correspond to the drive electrode E1 in the basic principle of touch detection illustrated in FIG. 1 to FIG. 3, the touch detection electrodes TDL correspond to the touch detection electrode E2, and the touch detection section 30 detects touch events in accordance with the basic principle. As illustrated in FIG. 7, the electrode patterns intersecting with each other configure an electrostatic capacitance type touch sensor in a matrix. Therefore, scan is performed over the entire touch detection surface of the touch detection section 30 so that a contact position or a proximal position of the external proximity object is detectable.

Figure 8:
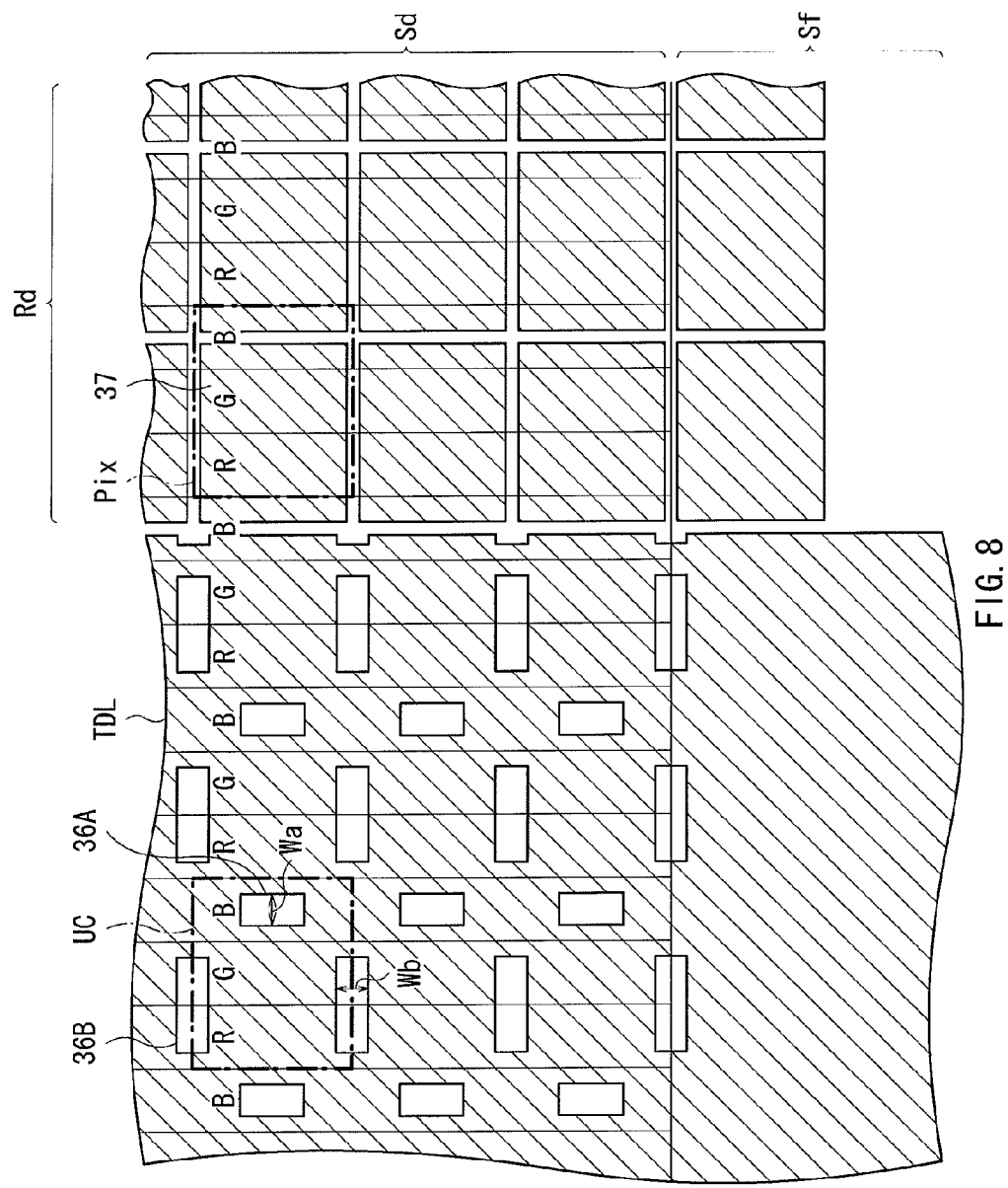
FIG. 8 is a plane view illustrating a configuration example of a touch detection electrode and dummy electrodes according to a first embodiment.

FIG. 8 illustrates a configuration example of the touch detection electrode TDL. The touch detection electrode TDL has a plurality of aperture portions 36 (aperture portions 36A and 36B) in a display region Sd arranged with the pixels Pix. The aperture portions 36 are formed to correspond to the pixels Pix. Specifically, the aperture portion 36A is formed in a portion corresponding to the sub-pixel SPix of blue (B). The aperture portion 36B is formed in a position corresponding to a boundary between the vertically adjacent pixels Pix in the figure. In other words, the aperture portion 36B is arranged in a position corresponding to the scan signal line GCL formed in the pixel substrate 2, namely, in a position where light is not transmitted. In this way, the aperture portions 36 are formed with a cycle of the pixel Pix. In other words, the touch detection electrode TDL is formed with the pixel Pix as a unit cell UC. The unit cell UC desirably has a size invisible by human eyes, for example, is desirably equal to or smaller than 500 μm. The touch detection electrode TDL is formed to extend to a frame region Sf outside of the display region Sd, and is connected to the touch detection circuit 40.

In a region between the adjacent touch detection electrodes TDL (an inter-detection-electrode region Rd), the plurality of dummy electrodes 37 are provided. Each of the dummy electrodes 37 is composed of ITO similar to the touch detection electrode TDL. The dummy electrodes 37 are also provided to correspond to the pixels Pix. Specifically, in FIG. 8, the dummy electrodes 37 are arranged so that a gap between the laterally adjacent dummy electrodes 37 in the figure corresponds to the sub-pixel SPix of blue (B) in the pixel Pix. Moreover, the dummy electrodes 37 are arranged so that a gap between the vertically adjacent dummy electrodes 37 in the figure corresponds to a boundary of the pixels Pix. In this way, the dummy electrodes 37 are also formed with a cycle of the pixel Pix. Like the unit cell UC, the dummy electrode 37 desirably has a size invisible by human eyes, and for example, is desirably equal to or smaller than 500 μm. Each of the dummy electrodes 37 is not electrically connected with other parts, and is in a floating state.

The reason why the aperture portions 36A in the touch detection electrode TDL, and the gap between the laterally adjacent dummy electrodes 37 are arranged to correspond to the sub-pixel SPix of blue (B) is that the light transmittance of the electrode in blue (B) is the lowest between red (R), green (G), and blue (B). In other words, by arranging the sub-pixel SPix of blue (B) in the aperture portion 36A or the gap between the dummy electrodes 37, light intensity of blue is lowered in these electrodes to prevent the chromaticity of white from changing to yellow.

Figure 9A:
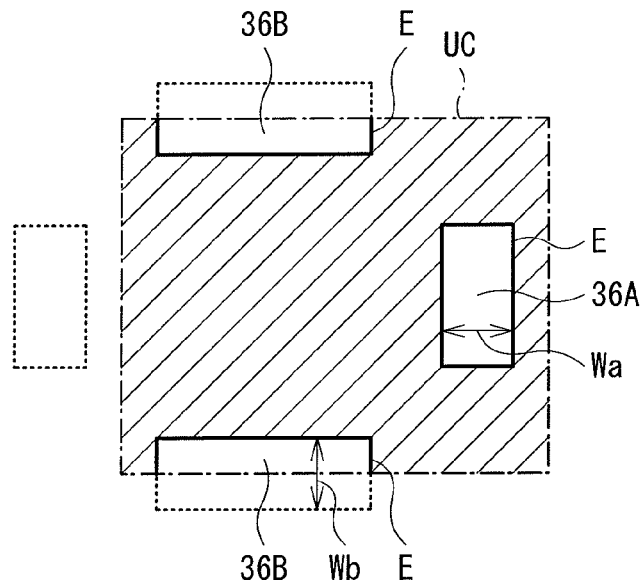
FIGS. 9A and 9B are plane views for explaining an electrode area ratio and a ratio of electrode edge length.
Figure 9B:
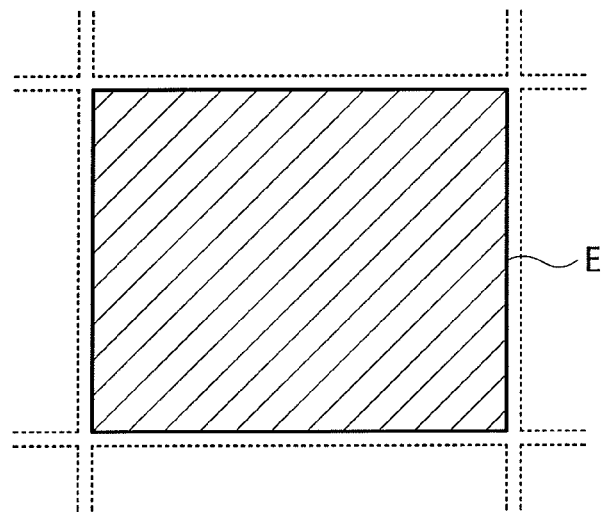

FIG. 9A illustrates a configuration example of the unit cell UC of the touch detection electrode TDL, and FIG. 9B illustrates a configuration example of the dummy electrode 37. In the display device with a touch detection function 1, an area (hatched portion) of a portion arranged with the electrode in the unit cell UC of the touch detection electrode TDL illustrated in FIG. 9A is almost equal to an area (hatched portion) of the dummy electrode 37 illustrated in FIG. 9B. In other words, an arrangement area ratio of the touch detection electrode TDL is almost equal to an arrangement area ratio of the dummy electrodes in the inter-detection-electrode region Rd.

In this case, the sub-pixel SPix corresponds to a specific example of "a display element" of the disclosure. The aperture portions 36A and 36B correspond to a specific example of "an aperture portion" of the disclosure. The unit cell UC corresponds to a specific example of "a detection electrode unit cell" of the disclosure. The pixel Pix corresponds to a specific example of "a display pixel" of the disclosure. The scan signal line GCL corresponds to a specific example of "a selection line" of the disclosure.

Functions and Effects

Subsequently, functions and effects of the display device with a touch detection function 1 according to the embodiment will be described.

General Operation Outline

The control section 11 supplies the control signal to the gate driver 12, the source driver 13, the drive electrode driver 14, and the touch detection circuit 40 based on the picture signal Vdisp supplied from outside, and controls these parts to operate in synchronization with one another. The gate driver 12 supplies the scan signal Vscan to the liquid crystal display section 20 to sequentially select one horizontal line to be driven for display. The source driver 13 supplies the pixel signal Vpix to each pixel Pix configuring one horizontal line selected by the gate driver 12. The drive electrode driver 14 sequentially applies the drive signal Vcom to the drive electrodes COML. The display section with a touch detection function 10 performs display operation, and performs touch detection operation based on the drive signal Vcom to output the touch detection signal Vdet from the touch detection electrodes TDL. The touch detection circuit 40 determines presence of touch events with respect to the touch detection section 30 and the touch coordinate, and outputs the result as the output signal Out.

In the display device with a touch detection function 1, the touch detection electrodes TDL and the dummy electrodes are formed so that the electrode area per unit cell UC (pixel Pix) in the touch detection electrode TDL is almost equal to the electrode area per unit cell UC in the inter-detection-electrode region Rd. Therefore, in a case where light enters from outside, the reflectance in the touch detection electrode TDL has a value close to the reflectance in the inter-detection-electrode region Rd, the touch detection electrode TDL is hardly viewed, and therefore the visibility of the display screen is improved. Hereinafter, the detail thereof will be described.

Reflectance Ratio

Figure 10A:
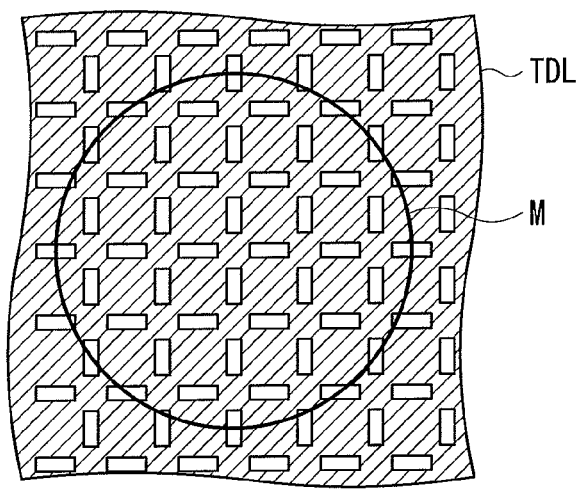
FIGS. 10A and 10B are schematic views for explaining a measurement of reflectance.
Figure 10B:
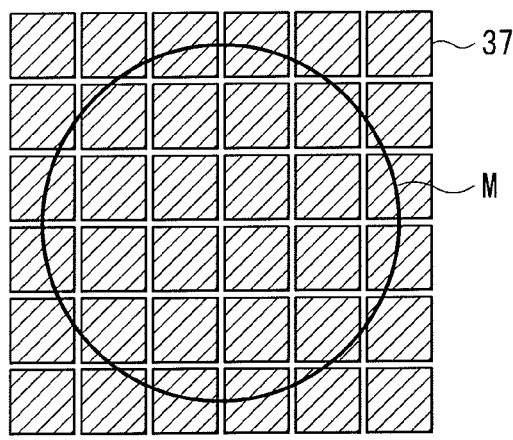

FIGS. 10A and 10B schematically illustrate measurements of the reflectance, where FIG. 10A illustrates a measurement in the touch detection electrode TDL, and FIG. 10B illustrates a measurement in the inter-detection-electrode region Rd. In the measurements, light is irradiated to each of the touch detection electrode TDL and the inter-detection-electrode region Rd, and each of the reflectance in a range (measurement area M) of a circle with a diameter of 600 μm at that time is determined. Then, a reflectance ratio Rref is obtained by dividing the reflectance in the inter-detection-electrode region Rd by the reflectance in the touch detection electrode TDL. As is obvious from the definition, it means that the closer the reflectance ratio Rref is to 100%, the closer the reflectance in the inter-detection-electrode region Rd is to the reflectance in the touch detection electrode TDL. In other words, as the reflectance ratio Rref is close to 100%, the touch detection electrode TDL is hardly viewed even when light enters from outside.

It is considered that light reflection is contributed by not only a top surface (for example, the hatched portions in FIGS. 9A and 9B) of the electrode but also a side surface (for example, edge portions E in FIGS. 9A and 9B) of the electrode. Therefore, a plurality of samples in which the area of the hatched portion (electrode area S) and a total length of the edge portion E (electrode edge length LE) are different from one another was made, and the reflectance ratio Rref of each of the samples was measured.

Figure 11A:
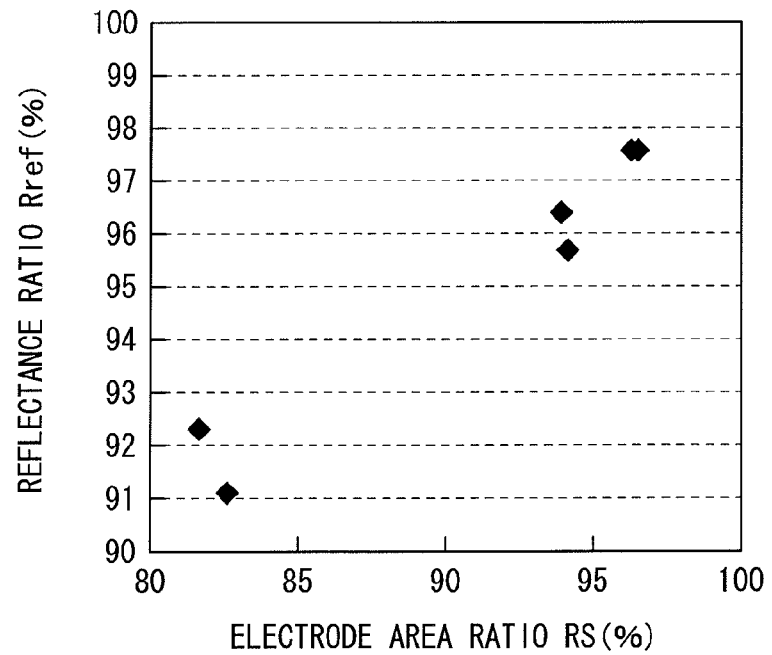
FIGS. 11A and 11B are characteristic diagrams illustrating an example of dependency of the electrode area ratio and dependency of the ratio of electrode edge length of reflectance ratio.
Figure 11B:
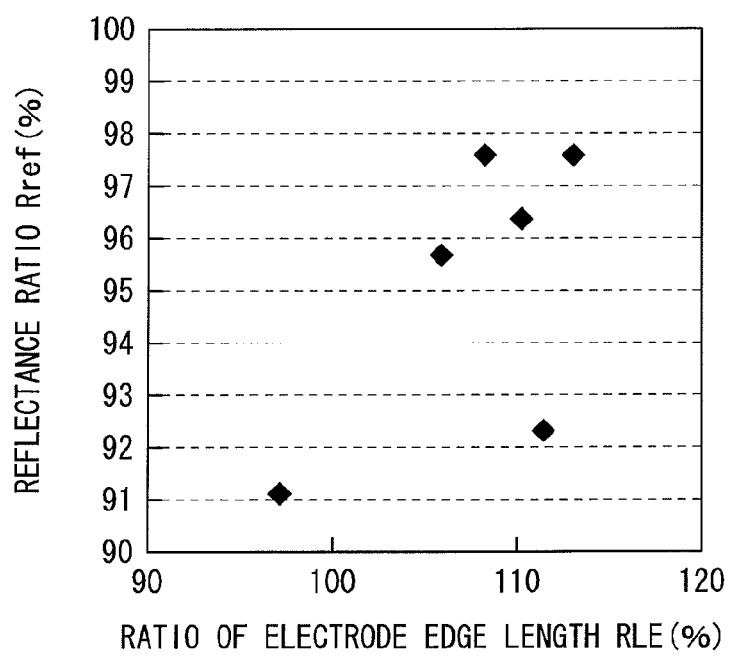

FIGS. 11A and 11B illustrate measurement results of the reflectance ratio Rref, where FIG. 11A illustrates dependency of an electrode area ratio RS, and FIG. 11B illustrates dependency of a ratio of electrode edge length RLE. In this case, the electrode area ratio RS is obtained by dividing the electrode area per unit cell UC (pixel Pix) in the inter-detection-electrode region Rd by the electrode area per unit cell UC in the touch detection electrode TDL. In addition, the ratio of electrode edge length RLE is obtained by dividing the electrode edge length per unit cell UC (pixel Pix) in the inter-detectionelectrode region Rd by the electrode edge length per unit cell UC in the touch detection electrode TDL.

As illustrated in FIG. 11A, the reflectance ratio Rref has a strong correlation with the electrode area ratio RS, and the larger the electrode area ratio RS is, the larger the reflectance ratio Rref is. In addition, as illustrated in FIG. 11B, the reflectance ratio Rref has a weak correlation with the ratio of electrode edge length RLE, and the longer the ratio of electrode edge length RLE is, the larger the reflectance ratio Rref is.

In the display device with a touch detection function 1, it is focused on the strong correlation between the reflectance ratio Rref and the electrode area ratio RS, and the touch detection electrodes TDL and the dummy electrodes 37 are formed so that the electrode area per unit cell UC (pixel Pix) in the touch detection electrode TDL is almost equal to the electrode area per unit cell UC in the inter-detection-electrode region Rd. This is achievable by providing the aperture portions 36 in the touch detection electrode TDL. Specifically, for example, the aperture width Wa of the aperture 36A and the aperture width Wb of the aperture 36B are adjusted so as to be wider than the distance between the adjacent dummy electrodes 37, and therefore the electrode area per unit cell UC (pixel Pix) in the touch detection electrode TDL is almost equal to the electrode area per unit cell UC in the inter-detection-electrode region Rd. Consequently, the reflectance in the touch detection electrode TDL may be set to a value close to the reflectance in the inter-detection-electrode region Rd. Therefore, even when light enters from outside, the touch detection electrode TDL is hardly viewed, and the visibility of the display screen may be improved.

In addition, as illustrated in FIG. 5, the polarizing plate 35 is formed on the display surface of the display device with a touch detection function 1. Accordingly, reflection light itself from the touch detection electrodes TDL or the dummy electrode 37 may be reduced, and therefore the touch detection electrodes TDL may be hardly viewed.

Although example will be described in detail later with reference to FIG. 19, the electrode area ratio RS is allowed to be close to 100%, and thus the reflectance ratio Rref may be closed to 100%. Therefore, it is confirmed that the visibility of the display screen is improved even when light enters from outside.

Alignment Marks

As illustrated in FIG. 8, in the display device with a touch detection function 1, the aperture portions 36 and the dummy electrodes 37 are arranged to correspond to the pixels Pix. This means that when the touch detection electrodes TDL and the dummy electrodes 37 are formed on the facing substrate 3, alignment with the pixels Pix is necessary. Hereinafter, alignment marks used for the alignment will be described in detail.

In the process of manufacturing the display device with a touch detection function 1, for example, a large pixel substrate 102 manufactured in a step of manufacturing the pixel substrate and a large facing substrate 103 manufactured in a step of manufacturing the facing substrate are overlaid with each other, the overlaid glass is reduced in thickness by grinding or etching as necessary, and then the touch detection electrode TDL and the dummy electrodes 37 are formed on the facing substrate 103. After these electrodes and the like are formed, the overlaid large substrates are cut, the various components are attached to each of the cut substrates, and the display device with a touch detection function 1 is assembled.

In the example of the manufacturing process, the touch detection electrodes TDL and the dummy electrodes 37 are formed after the large pixel substrate 102 and the large facing substrate 103 are overlaid. Therefore the alignment marks used for the formation of the electrodes may be alignment marks used in the step of manufacturing the pixel substrate or may be alignment marks used in the step of manufacturing the facing substrate.

Figure 12B:
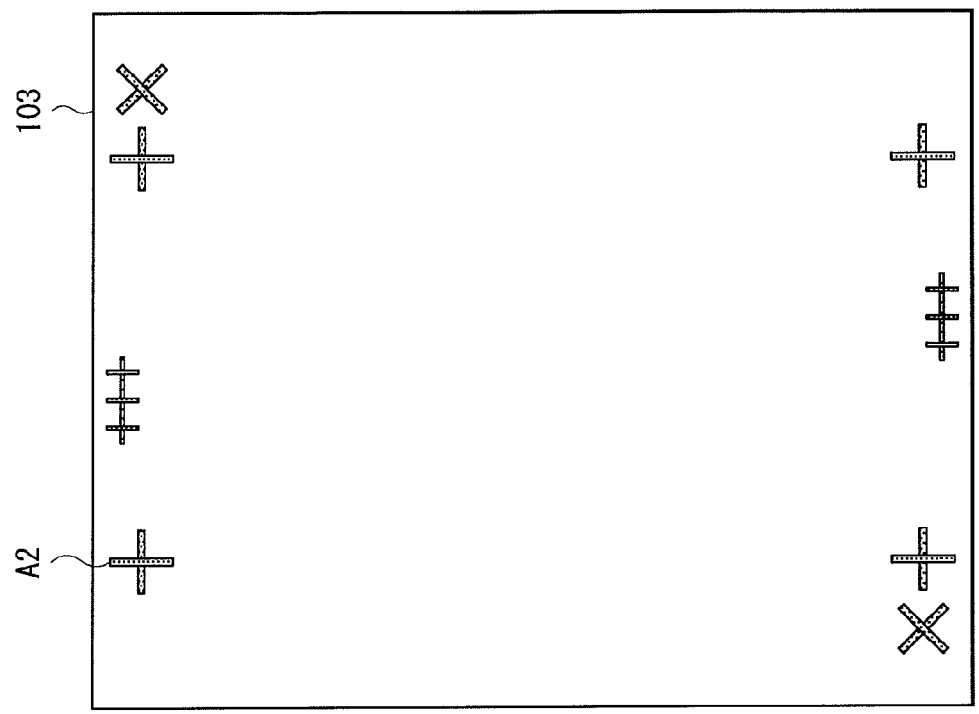
FIGS. 12A and 12B are diagrams illustrating alignment marks according to the embodiment.
Figure 12A:
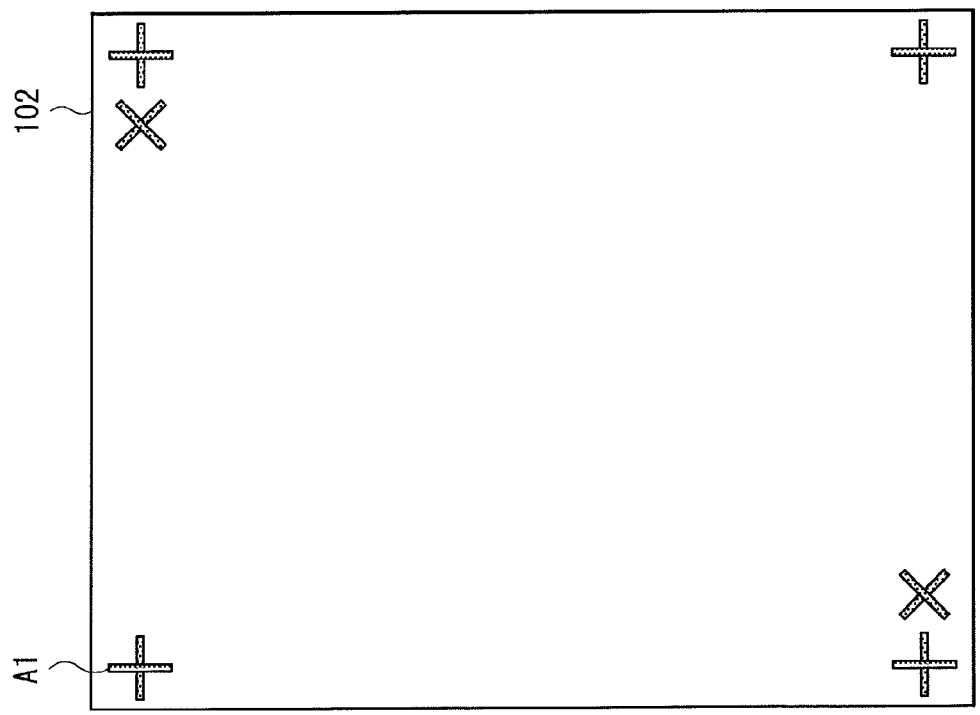

FIG. 12A illustrates an example of the alignment marks of the large pixel substrate 102, and FIG. 12B illustrates an example of the alignment marks of the large facing substrate 103. The alignment marks of the large pixel substrate 102 illustrated in FIG. 12A are used for forming the TFT element Tr, the pixel electrode 22, the pixel signal line SGL, the scan signal line GCL, and the like on the TFT substrate 21 or for examining them in the step of manufacturing the pixel substrate. The alignment marks of the large facing substrate 103 illustrated in FIG. 12B are used for forming the color filter 32, the drive electrodes COML, and the like on the glass substrate 31, or for examining them in the step of manufacturing the facing substrate.

To use the alignment marks at the time of forming the touch detection electrodes TDL and the dummy electrodes 37, the alignment marks need to be detectable from outside at the time of overlaying the large pixel substrate 102 and the large facing substrate 103. Specifically, for example, in a case where an alignment mark A1 of the large pixel substrate 102 illustrated in FIG. 12A is used for forming the touch detection electrodes TDL and the like, at the position on the large facing substrate 103 corresponding to the position of the alignment mark A1, it is necessary that no pattern is provided. In addition, in a case where an alignment mark A2 of the large facing substrate 103 illustrated in FIG. 12B is used for forming the touch detection electrodes TDL and the like, at the position on the large pixel substrate 102 corresponding to the position of the alignment mark A2, it is necessary that no pattern is provided. In this way, even when the large pixel substrate 102 and the large facing substrate 103 are overlaid, the alignment marks (for example, the alignment marks A1 and A2) used for forming the touch detection electrodes TDL are detected, and therefore misrecognition of the device and error in reading may be prevented.

Although in the above description, the touch detection electrodes TDL and the dummy electrodes 37 are formed after the large pixel substrate 102 and the large facing substrate 103 are overlaid, this is not limitative. Alternatively, for example, after the touch detection electrodes TDL and the dummy electrodes 37 are formed on the large facing substrate in the step of manufacturing the facing substrate, the large pixel substrate 102 and the large facing substrate 103 may be overlaid. In this case, for example, in the step of manufacturing the facing substrate, the touch detection electrodes TDL and the dummy electrodes 37 may be formed after the facing substrate pattern of the color filter and the like is formed, or the facing substrate pattern may be formed after the touch detection electrodes TDL and the dummy electrodes 37 are formed. In this case, the touch detection electrodes TDL and the like are formed with use of the alignment marks of the large facing substrate in the step of manufacturing the facing substrate.

Effects

In the embodiment as described above, the aperture portions are provided in the touch detection electrodes. Therefore, the electrode area per unit cell UC (pixel Pix) in the touch detection electrode may be almost equal to the electrode area per unit cell UC in the inter-detection-electrode region. In addition, the reflectance of respective regions are almost equal to each other, and therefore visibility of the display screen may be improved when light enters from outside.

In the embodiment, some of the aperture portions of the touch detection electrode are arranged at the positions corresponding to the scan signal line so that influence of change in luminance caused by the aperture portions may be reduced.

In the embodiment, some of the aperture portions of the touch detection electrode are provided in the sub-pixel region of blue so that the color shift of white caused by the reduced light intensity of blue in the touch detection electrode may be suppressed.

In the embodiment, the alignment marks used for manufacturing the pixel substrate and the facing substrate are commonly used to form the touch detection electrodes and the dummy electrodes so that the position of the pixels and the position of the touch detection electrodes are adjusted with high precision. Therefore, the gap between the position of the displayed object and the touch detection position when the displayed object on the display device is touched may be reduced, and the high precision of the position detection is achievable. In addition, it is unnecessary to provide dedicated alignment marks for forming the touch detection electrodes and the dummy electrodes, thereby making the pattern simple.

Modification 1-1

Although in the above-described embodiment, the dummy electrodes have been formed with the cycle of the pixel Pix, this is not limitative. Alternatively, for example, the dummy electrodes may be formed with a cycle of a plurality of pixels Pix. Exemplified below is a case where each of the dummy electrodes is formed with a cycle of four pixels Pix.

Figure 13:
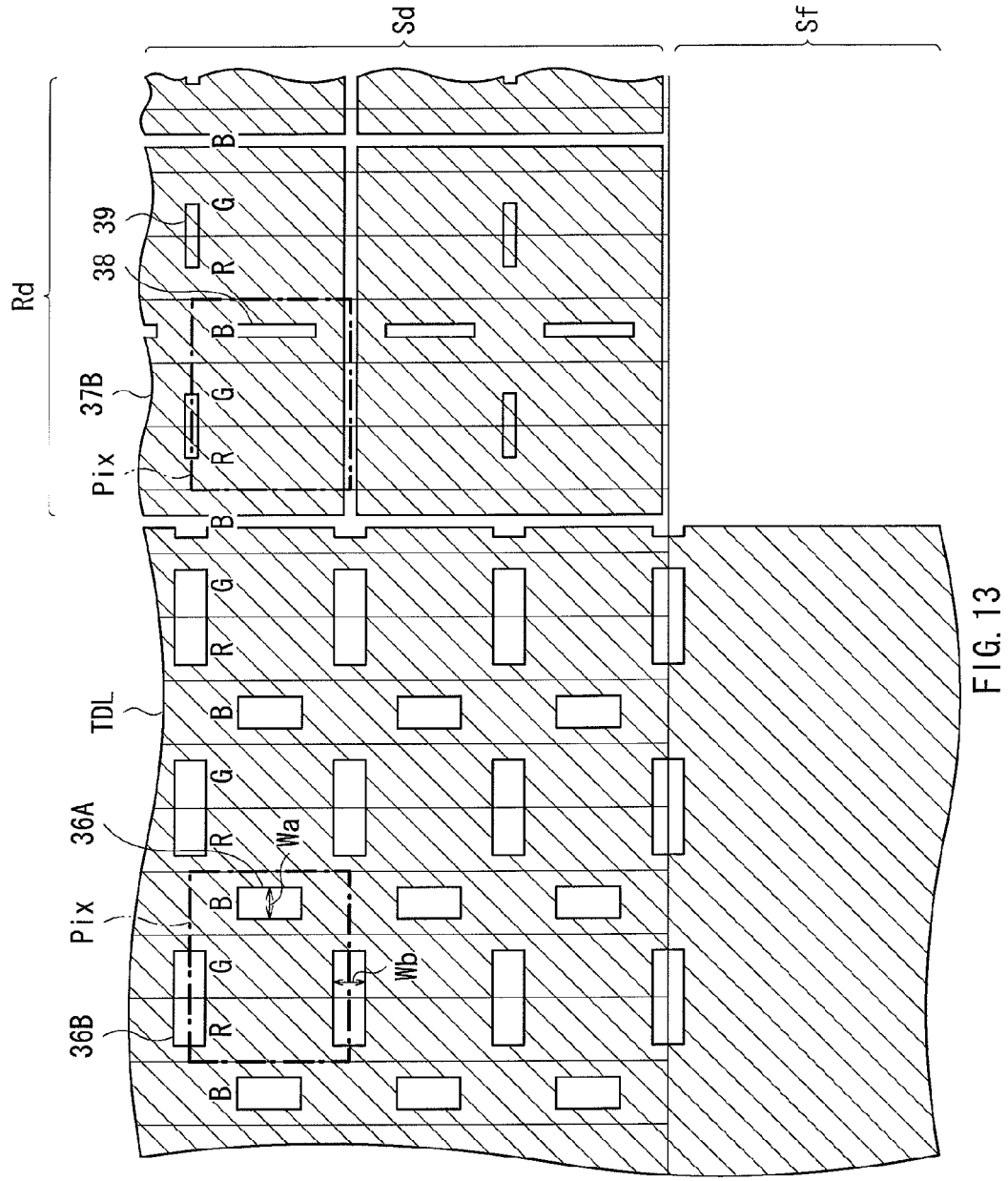
FIG. 13 is a plane view illustrating a configuration example of a touch detection electrode and dummy electrodes according to a modification of the first embodiment.

FIG. 13 illustrates a configuration example of a dummy electrode 37B of a display device with a touch detection function 1B according to the modification. The dummy electrode 37B has a shape in which the adjacent four dummy electrodes 37 in FIG. 8 are connected with one another. The dummy electrode 37B has aperture portions 38 and 39 at the positions corresponding to the gap between the four dummy electrodes 37 in FIG. 8. The dummy electrode 37B is desirably has a size invisible by human eyes, and is, for example, desirably equal to or smaller than 500 μm, similar to the dummy electrode 37 or the like. Also in this case, for example, the aperture width Wa of the aperture portion 36A and the aperture width Wb of the aperture portion 36B are adjusted so that an arrangement area ratio of the touch detection electrode TDL is almost equal to an arrangement area ratio of the dummy electrodes in the inter-detection-electrodes region Rd. Therefore, when light enters from outside, visibility of the display screen may be improved.

Modification 1-2

Although in the above-described embodiment, the unit cell UC has been intended to correspond to the size of the pixel Pix, this is not limitative. For example, the unit cell UC may correspond to the size of the plurality of pixels Pix. Specifically, in FIG. 8, for example, either one of two aperture portions 36B vertically arranged in the figure is removed so that the unit cell UC may correspond to the size of the two pixels Pix.

3. Second Embodiment

Next, a display device with a touch detection function 5 according to a second embodiment of the disclosure will be described. In the second embodiment, aperture portions of the touch detection electrode are formed based on not only the electrode area but also the electrode edge length. In other words, the display device with a touch detection function 5 is configured by using a display section with a touch detection function 50 including such aperture portions. Other configurations are the same as that in the above-described first embodiment (FIG. 4 and the like). Note that like numerals are used to designate substantially like components of the display device with a touch detection function 1 according to the first embodiment, and the description thereof are appropriately omitted.

Figure 14:
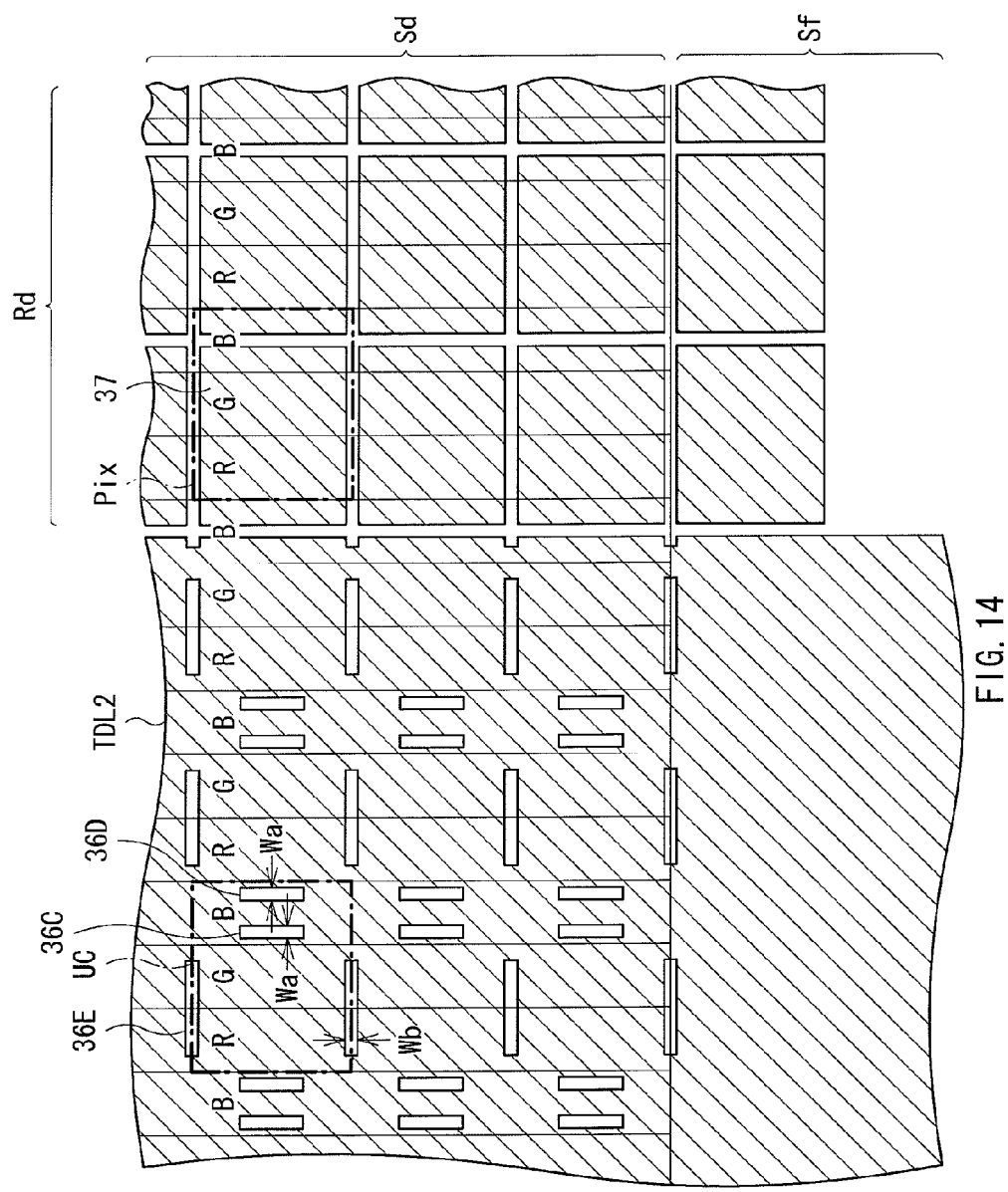
FIG. 14 is a plane view illustrating a configuration example of a touch detection electrode and dummy electrodes according to a second embodiment.

FIG. 14 illustrates a configuration example of a touch detection electrode TDL2 of the display device with a touch detection function 5. The touch detection electrode TDL2 has aperture portions 36C, 36D, and 36E in the display region Sd arranged with the pixels Pix. The aperture portions 36C and 36D are formed in a portion corresponding to the sub-pixel SPix of blue (B), and the aperture portion 36E is arranged in a position corresponding to a boundary between vertically adjacent pixels Pix in the figure.

FIGS. 15A and 15B are plane views for explaining the electrode area ratio RS and the ratio of electrode edge length RLE in the display device with a touch detection function 5, where FIG. 15A illustrates a unit cell UC of the touch detection electrode TDL2, and FIG. 15B illustrates the dummy electrode 37.

In the display device with a touch detection function 5, similar to the display device with a touch detection function 1 according to the above-described first embodiment and the like, the electrode area (hatched portion in FIG. 15A) per unit cell UC in the touch detection electrode TDL2 is almost equal to the electrode area (hatched area in FIG. 15B) of the dummy electrode 37. Specifically, for example, the aperture width Wa of each of the aperture portions 36C and 36D and the aperture width Wb of the aperture portion 36E are adjusted so that the electrode area per unit cell UC in the touch detection electrode TDL2 is almost equal to the electrode area of the dummy electrode 37. Note that the aperture width Wa and the aperture width Wb may be equal to each other, or may be different from each other.

Moreover, in the display device with a touch detection function 5, in FIG. 15, the electrode edge length in the vertical direction in the touch detection electrode TDL2 is almost equal to that in the inter-detection-electrode region Rd. Specifically, the total length of four vertical edge portions ET (the electrode edge length in the vertical direction) according to the left side of the electrode in FIG. 15A is almost equal to the length of the vertical edge portion ET according to the left side of the dummy electrode 37 in FIG. 15B.

In the display device with a touch detection function 5, the touch detection electrode TDL2 and the dummy electrode 37 are formed so that the electrode edge length in the vertical direction in the touch detection electrode TDL 2 is almost equal to that in the inter-detection-electrode region Rd, besides the electrode area per unit cell UC (pixel Pix). Therefore, the reflectance in the touch detection electrode TDL2 may have a value close to the reflectance in the inter-detection-electrode region Rd.

Although example will be described in detail later with reference to FIG. 19, it is confirmed that the electrode area ratio RS and the ratio of electrode edge length RLE are close to 100% so that the reflectance ratio Rref is close to 100%. Therefore, when light enters from outside, visibility of the display screen may be improved.

In the embodiment as described above, in addition to the electrode area, the electrode edge length in the vertical direction in the touch detection electrode has been almost equal to that in the inter-detection-electrode region. Therefore, by allowing the reflectance in each region to be almost equal to each other, even when light enters from outside, visibility of the display screen may be improved. Other effects are the same as in the above-described first embodiment.

Modification 2

Although in the above-described embodiment, the aperture portions have been configured so that the electrode edge length in the vertical direction is the same between the touch detection electrode and the inter-detection-electrode region, this is not limitative. Alternatively, for example, the aperture portions may be configured so that the electrode edge length in the lateral direction is the same. The example will be described below.

Figure 16:
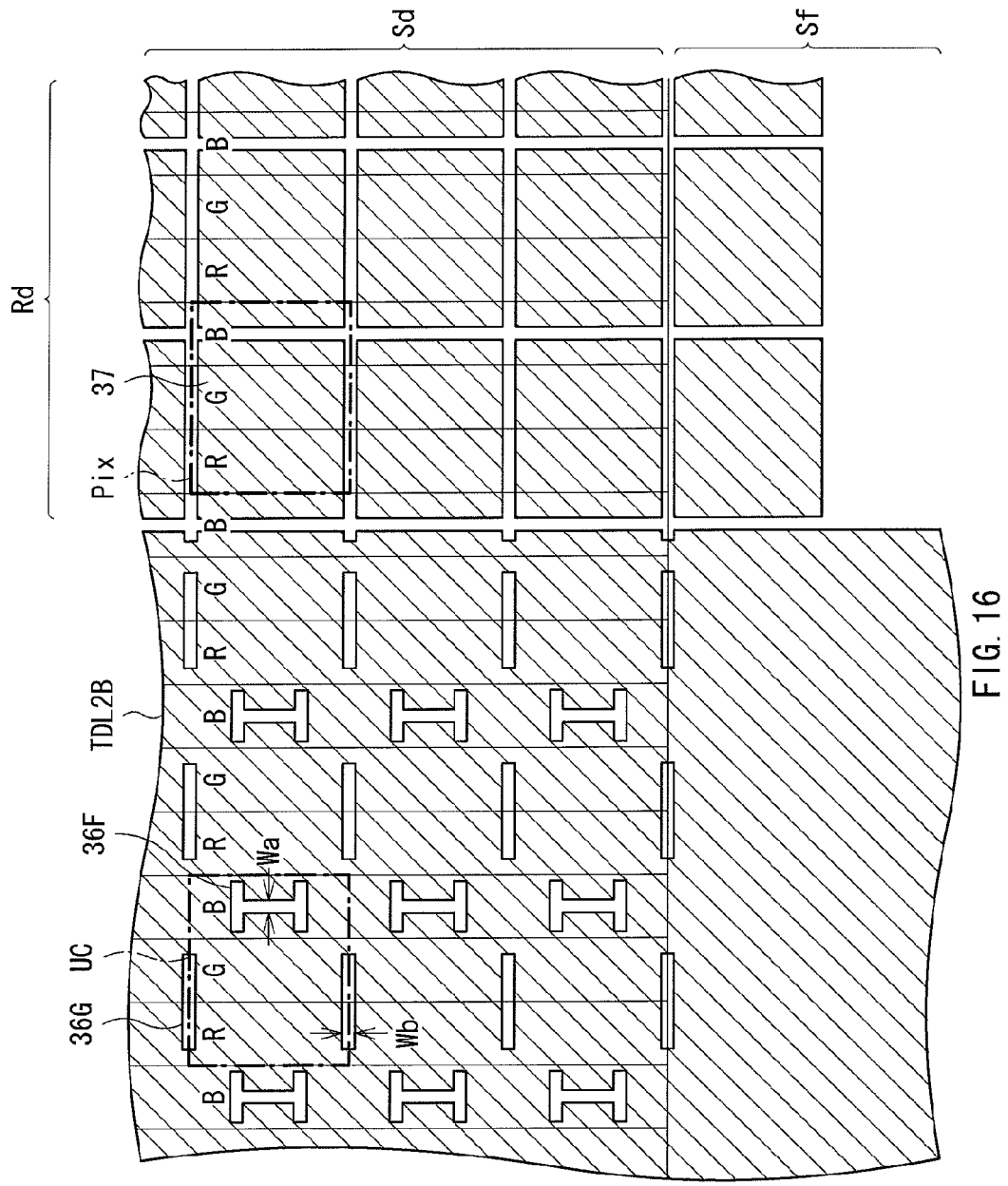
FIG. 16 is a plane view illustrating a configuration example of a touch detection electrode and dummy electrodes according to a modification of the second embodiment.

FIG. 16 illustrates an example of a touch detection electrode TDL2B in a display device with a touch detection function 5B according to the modification. The touch detection electrode TDL2B has aperture portions 36F and 36G. The aperture portion 36F is formed in a portion corresponding to the sub-pixel SPix of blue (B), and the aperture portion 36G is formed in a position corresponding to a boundary between vertically adjacent pixels Pix in the figure. The aperture portion 36F is shaped like a letter "I", and therefore, the electrode edge length thereof in the lateral direction may be adjusted.

Figure 17A:
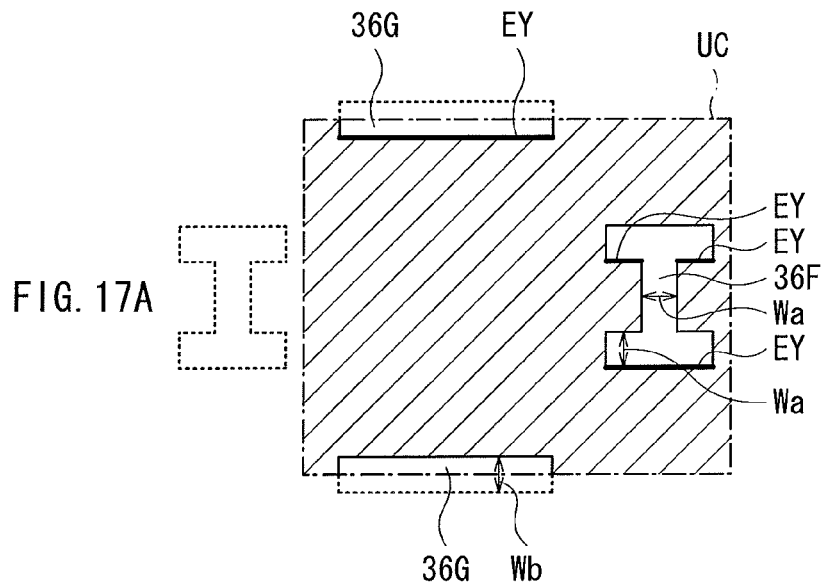
FIGS. 17A and 17B are plane views for explaining a lateral electrode edge length according to the modification of the second embodiment.
Figure 17B:
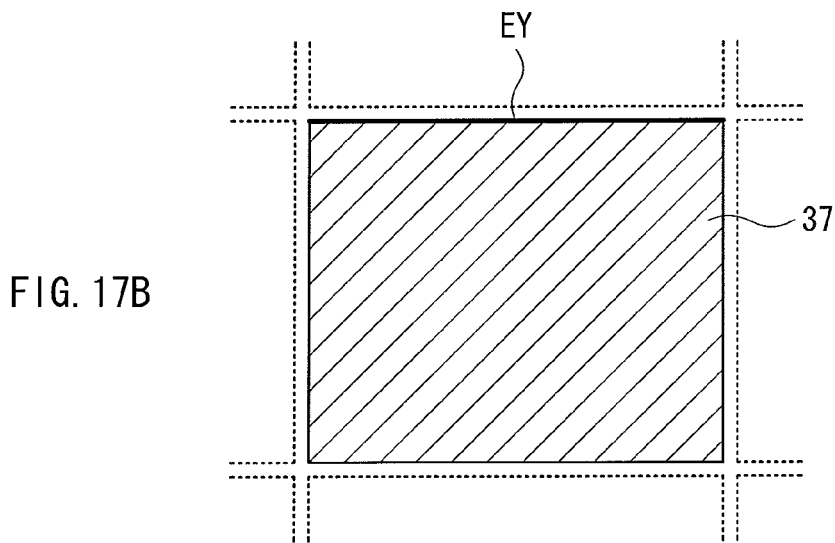

FIGS. 17A and 17B are plane views for explaining the electrode area ratio RS and the ratio of electrode edge length RLE of the display device with a touch detection function 5B, where FIG. 17A illustrates a unit cell UC of the touch detection electrode TDL2B, and FIG. 17B illustrates the dummy electrode 37. In the display device with a touch detection function 5B, similar to the display device with a touch detection function 5 in the embodiment, the electrode area (hatched portion in FIG. 17A) per unit cell UC in the touch detection electrode TDL2B is almost equal to the electrode area (hatched portion in FIG. 17B) of the dummy electrode 37. Specifically, for example, the aperture width Wa of the aperture portion 36F and the aperture width Wb of the aperture portion 36G are adjusted so that the electrode areas thereof are almost equal to each other. In addition, in the display device with a touch detection function 5B, in FIG. 17, the electrode edge length in the lateral direction is almost the same between the touch detection electrode TDL2B and the inter-detection-electrode region Rd. Specifically, the total length of four lateral edge portions EY according to the top side of the electrode in FIG. 17A is almost equal to the length of a lateral edge portion EY according to the top side of the dummy electrode 37 in FIG. 17B.

4. Third Embodiment

Next, a display device with a touch detection function 7 according to a third embodiment of the disclosure will be described. In the third embodiment, the aperture portions of the touch detection electrode are configured such that both the electrode area and the electrode edge length are almost the same between the touch detection electrode and the inter-detection-electrode region. In other words, the display device with a touch detection function 7 is configured by using a display section with a touch detection function 70 having such aperture portions. The other configurations are the same as in the above-described first embodiment (FIG. 4 and the like). Note that like numerals are used to designate substantially like components of the display device with a touch detection function 1 according to the first embodiment, and the description thereof are appropriately omitted.

Figure 18:
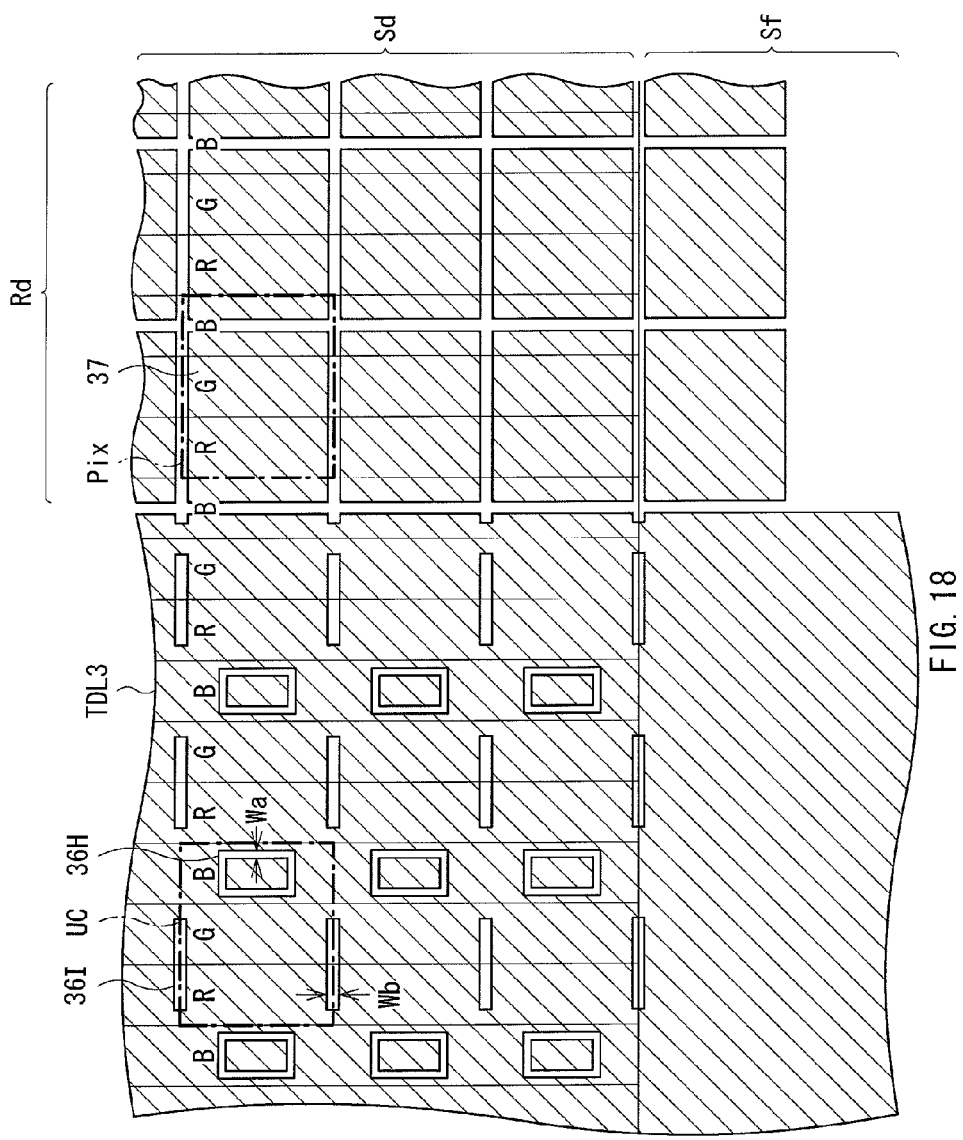
FIG. 18 is a plane view illustrating a configuration example of a touch detection electrode and dummy electrodes according to a third embodiment.

FIG. 18 illustrates a configuration example of a touch detection electrode TDL3 of the display device with a touch detection function 7. The touch detection electrode TDL3 has aperture portions 36H and 36I in the display region Sd arranged with the pixels Pix. The aperture portion 36H is formed in a portion corresponding to the sub-pixel SPix of blue (B), and the aperture portion 36I is formed in a position corresponding to a boundary between vertically adjacent pixels Pix in the figure. The aperture portion 36H has a rectangular frame shape so as to adjust the electrode edge length in the lateral direction and the electrode edge length in the vertical direction independently of each other.

In the display device with a touch detection function 7, similar to the display device with a touch detection function 1 according to the above-described first embodiment, the electrode area per unit cell UC in the touch detection electrode TDL3 is almost equal to the electrode area in the dummy electrode 37. Specifically, for example, the aperture width Wa of the aperture portion 36H and the aperture width Wb of the aperture portion 36I are adjusted so that these electrode areas are almost equal to each other.

Moreover, in the display device with a touch detection function 7, similar to the display devices with a touch detection function 5 and 5B according to the above-described second embodiment, the electrode edge length in the vertical direction and the electrode edge length in the lateral direction are almost the same between the touch detection electrode TDL3 and the inter-detection-electrode region Rd. In particular, in the display device with a touch detection function 7, both the electrode edge length in the vertical direction and the electrode edge length in the lateral direction may be independently set.

In the display device with a touch detection function 7, the touch detection electrode TDL3 and the dummy electrode 37 are formed so that the electrode area per unit cell UC (pixel Pix) and the electrode edge length in the vertical direction and in the lateral direction are almost the same between the touch detection electrode TDL3 and the inter-detection-electrode region Rd. Therefore, the reflectance in the touch detection electrode TDL3 and the reflectance in the inter-detection-electrode region Rd may be close to each other, and visibility of the display screen may be improved.

Although example will be described in detail later with reference to FIG. 19, the electrode area ratio RS and the ratio of electrode edge length RLE are close to 100% so that the reflectance ratio Rref is close to 100%. Accordingly, it is confirmed that visibility of the display screen may be improved even when light enters from outside.

As described above, in the embodiment, the electrode area and the electrode edge length in the vertical direction and in the lateral direction are almost the same between the touch detection electrode and the inter-detection-electrode region so that the reflectance in each region is almost equal to each other. Consequently, even when light enters from outside, visibility of the display screen may be improved. Other effects are the same as in the above-described first embodiment.

5. Example

The display devices with a touch detection function 1, 1B, 5, 5B, and 7 which have been described as the first to third embodiments and the modifications thereof were experimentally manufactured, and the evaluations thereof were performed. The details will be described below.

FIG. 19 illustrates the display devices with a touch detection function 1, 1B, 5, 5B, and 7 which were experimentally manufactured and the evaluation results thereof. The electrode area ratio RS and the ratio of electrode edge length RLE of each of the display devices with a touch detection function 1, 1B, 5, 5B, and 7 experimentally manufactured were set to various values as illustrated in FIG. 19. Note that the thickness of each of the electrodes (the touch detection electrode and the dummy electrode) was the same in the all display devices. The evaluation was performed for three evaluation items of a reflectance ratio Rref, reflection visibility, and transmission visibility. In the evaluation of reflection visibility, the evaluation was performed to determine whether a touch detection electrode was visible under four conditions of "Sun under sunlight", "Sky under sun light", "Fluorescent lamp under fluorescent light", and "Others under fluorescent light". In this case, the condition of "Sun under sunlight" indicated a case where sunlight was regularly reflected under the sunlight, the condition of "Sky under sunlight" indicated a case where a reflection direction was other than a light source (the sun) (for example, blue sky) under the sunlight, the condition of "Fluorescent lamp under fluorescent light" indicated a case where fluorescent light was regularly reflected, and the condition of "Others under fluorescent light" indicated a case where a reflection direction was other than a light source (the fluorescent lamp) under the fluorescent light. In the evaluations under the conditions, a case where the touch detection electrode was not viewed from any directions was regarded as "good", and a case where the touch detection electrode was viewed from all directions was regarded as "bad". In addition, a case where the touch detection electrode was viewed from certain directions, but not viewed from the front of the display screen was regarded as "acceptable". Moreover, in the evaluation of the transmission visibility, the evaluation was performed to determine whether the touch detection electrode was visible when the display screen was viewed. In the evaluation, a case where the touch detection electrode was invisible from any directions was regarded as "good".

In the display devices with a touch detection function 1, 1B, 5, 5B, and 7 described in the first to third embodiments, the touch detection electrode and the dummy electrode were formed so that the arrangement area ratio of the touch detection electrode TDL was almost equal to the arrangement area ratio of the dummy electrodes in the inter-detection-electrode region Rd, and the electrode area ratio RS of each device was a value close to 100%. In addition, in the display devices with a touch detection function 5, 5B, and 7 according to the second and third embodiments, the touch detection electrode and the dummy electrode were formed so that the ratio of electrode edge length RLE was a value close to 100%. In particular, in the display device with a touch detection function 7 according to the third embodiment, the ratio of electrode edge length RLE was a value extremely close to 100%. Accordingly, the reflectance ratio Rref was a value close to 100% in any display device with a touch detection function. In the measurement results of the reflection visibility, although a slight difference was observed, substantially good characteristics were obtained in any display device with a touch detection function. Particularly, in the display device with a touch detection function 7 according to the third embodiment, under the conditions of "Sun under sunlight" and "Fluorescent lamp under fluorescent light", characteristics better than those of other display devices under other conditions were obtained.

As illustrated in FIG. 19, to obtain good reflection visibility, the electrode area ratio RS was desirably set within a range of 98% to 102%. Preferably, the electrode area ratio RS was set within a range of 99% to 101%.

Moreover, to confirm the effects of the display devices with a touch detection function 1, 1B, 5, 5B, and 7, some display devices with a touch detection function (comparative examples 1 to 4) were experimentally manufactured. The display devices with a touch detection function according to the comparative examples each has the aperture portions 36 same as those of the display device with a touch detection function 1 (FIG. 8) according to the first embodiment. However, in the comparative examples, different from the display device with a touch detection function 1, as illustrated in FIG. 19, the width of the aperture portion 36 was equal to the distance between the adjacent dummy electrodes 37, and therefore the electrode area ratio RS was not close to 100%, and the reflectance ratio Rref was also not close to 100%. Accordingly, as the measurement results of the reflection visibility according to the comparative examples, as illustrated in FIG. 19, the characteristics inferior to those of the display devices with a touch detection function 1, 1B, 5, 5B, and 7 according to the above-described embodiments were obtained.

Note that as for the transmission visibility, in any of the display devices with a touch detection function 1, 1B, 5, 5B, and 7 described in the first to third embodiments and the display devices with a touch detection function according to the comparative examples (comparative examples 1 to 4), favorable characteristics were obtained.

6. Application Examples

Next, application examples of the display devices with a touch detection function described in the embodiments and the modifications will be described with reference to FIG. 20 to FIG. 24G. The display device with a touch detection function of the above-described embodiments and the like is applicable to electronic units in any fields, such as a television, a digital camera, a notebook personal computer, a portable terminal device such as a mobile phone, and a video camera. In other words, the display device with a touch detection function of the above-described embodiments and the like is applicable to electronic units in various fields for displaying a picture signal input from outside or a picture signal internally generated as an image or a picture.

Application Example 1

Figure 20:
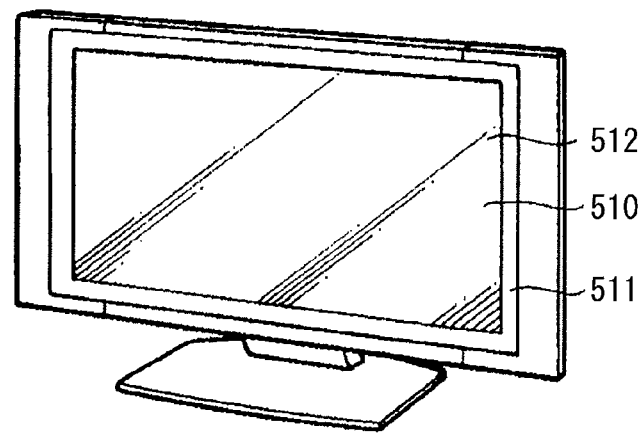
FIG. 20 is a perspective view illustrating an appearance configuration of an application example 1 of the display device with a touch detection function applied with the embodiment.

FIG. 20 illustrates an appearance of a television to which the display device with a touch detection function of the above-described embodiments and the like is applied. The television has, for example, a picture display screen section 510 including a front panel 511 and a filter glass 512. The picture display screen section 510 is configured of the display device with a touch detection function according to the above-described embodiments and the like.

Application Example 2

Figure 21A:
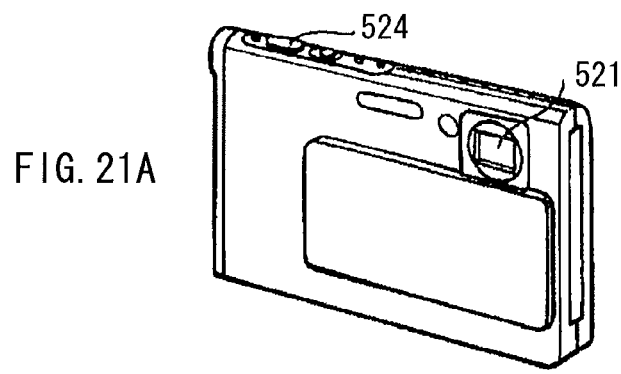
FIGS. 21A and 21B are perspective views illustrating an appearance configuration of an application example 2.
Figure 21B:
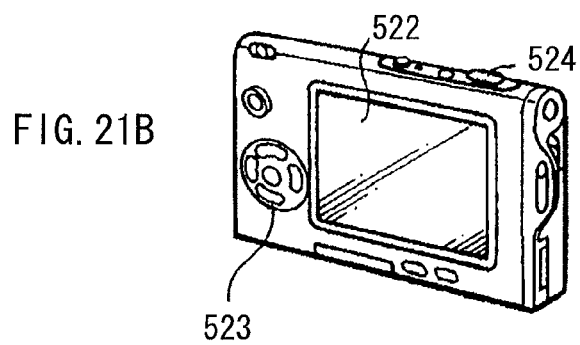

FIGS. 21A and 21B illustrate an appearance of a digital camera to which the display device with a touch detection function of the above-described embodiments and the like is applied. The digital camera has, for example, a light emitting section for a flash 521, a display section 522, a menu switch 523, and a shutter button 524. The display section 522 is configured of the display device with a touch detection function according to the above-described embodiments and the like.

Application Example 3

Figure 22:
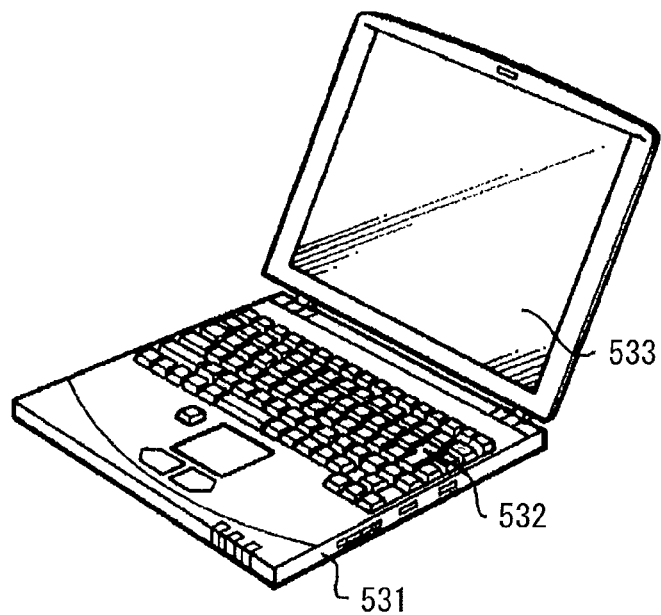
FIG. 22 is a perspective view illustrating an appearance configuration of an application example 3.

FIG. 22 illustrates an appearance of a notebook personal computer to which the display device with a touch detection function of the above-described embodiments and the like is applied. The notebook personal computer has, for example, a main body 531, a keyboard 532 for operation of inputting characters and the like, and a display section 533 for displaying an image. The display section 533 is configured of the display device with a touch detection function according to the above-described embodiments and the like.

Application Example 4

Figure 23:
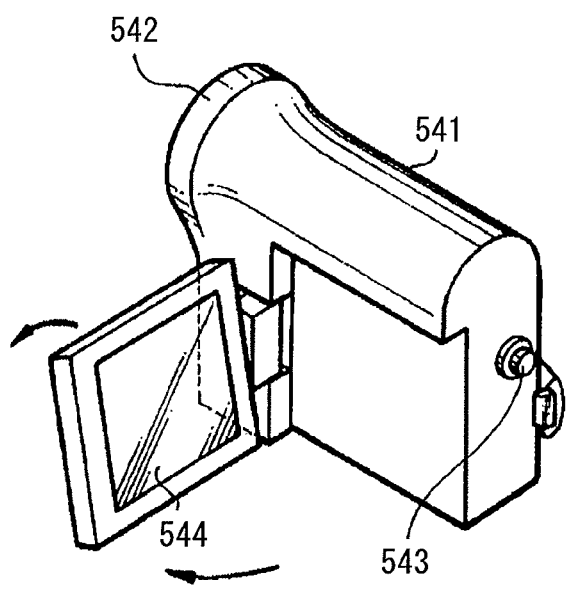
FIG. 23 is a perspective view illustrating an appearance configuration of an application example 4.
Figure 24:
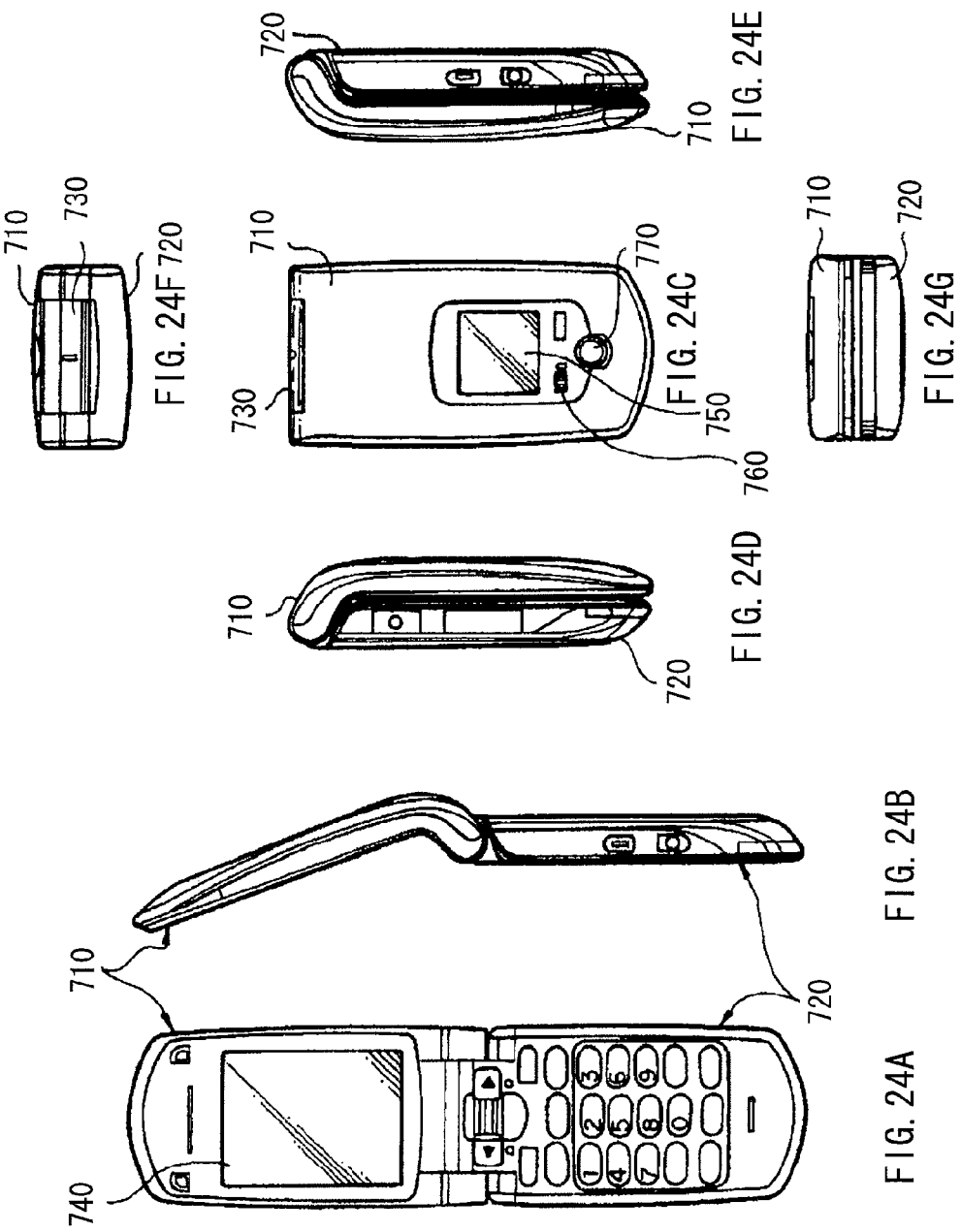
FIGS. 24A to 24G are front views, side views, a top view, and a bottom view illustrating an appearance configuration of an application example 5

FIG. 23 illustrates an appearance of a video camera to which the display device with a touch detection function of the above-described embodiments and the like is applied. The video camera has, for example, a main body 541, a lens 542 for shooting an object provided on the front side face of the main body 541, a shooting start/stop switch 543, and a display section 544. Also, the display section 544 is configured of the display device with a touch detection function according to the above-described embodiments and the like.

Application Example 5

FIGS. 24A to 24G illustrate an appearance of a mobile phone to which the display device with a touch detection function of the above-described embodiments and the like is applied. In the mobile phone, for example, a top-side enclosure 710 and a bottom-side enclosure 720 are joined by a joint section (a hinge section) 730. The mobile phone has a display 740, a sub-display 750, a picture light 760, and a camera 770. The display 740 or the sub-display 750 is configured of the display device with a touch detection function according to the above-described embodiments and the like.

Hereinbefore, although the disclosure has been described with referring to the several embodiments, the modifications, the examples, and the application examples to the electronic units, the disclosure is not limited thereto, and various modifications may be made.

Figure 25:
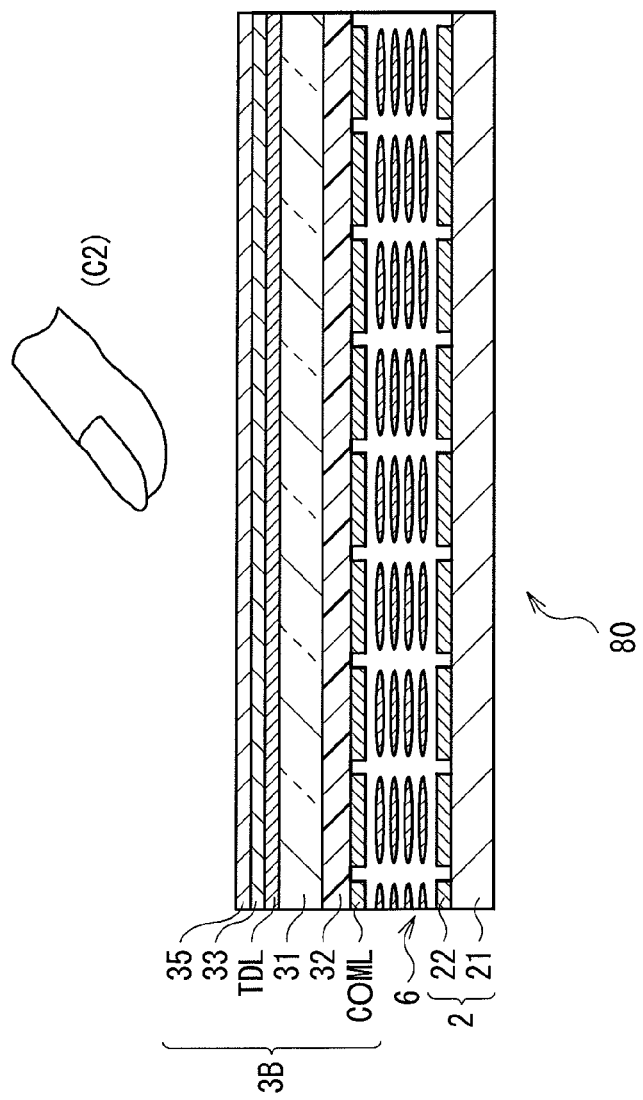
FIG. 25 is a sectional view illustrating a schematic cross-sectional configuration of a display section with a touch detection function according to a modification of the embodiment.

For example, although in the above-described embodiments and the like, the light transmitting layer 33 is formed between the glass substrate 31 and the touch detection electrode TDL, this is not limitative. Alternatively, the light transmitting layer 33 may be provided on the touch detection electrode TDL as illustrated in FIG. 25

For example, although in the above-described embodiments and the like, the light transmitting layer 33 is provided, this is not limitative, and alternatively the light transmitting layer 33 may be omitted.

For example, although in the above-described embodiments and the like, the arrangement area ratio of the touch detection electrode and the arrangement area ratio of the dummy electrodes is almost equal to each other, this is not limitative. Alternatively, the total length of all sides of the aperture portion per unit area and the total length of all sides of the dummy electrode per unit area may be almost equal to each other. In this case, the reflectance in the touch detection electrode may be almost equal to the reflectance in the dummy electrode, and therefore, when light enters from outside, degradation in visibility of the display screen caused by the touch detection electrode may be suppressed.

Figure 26:
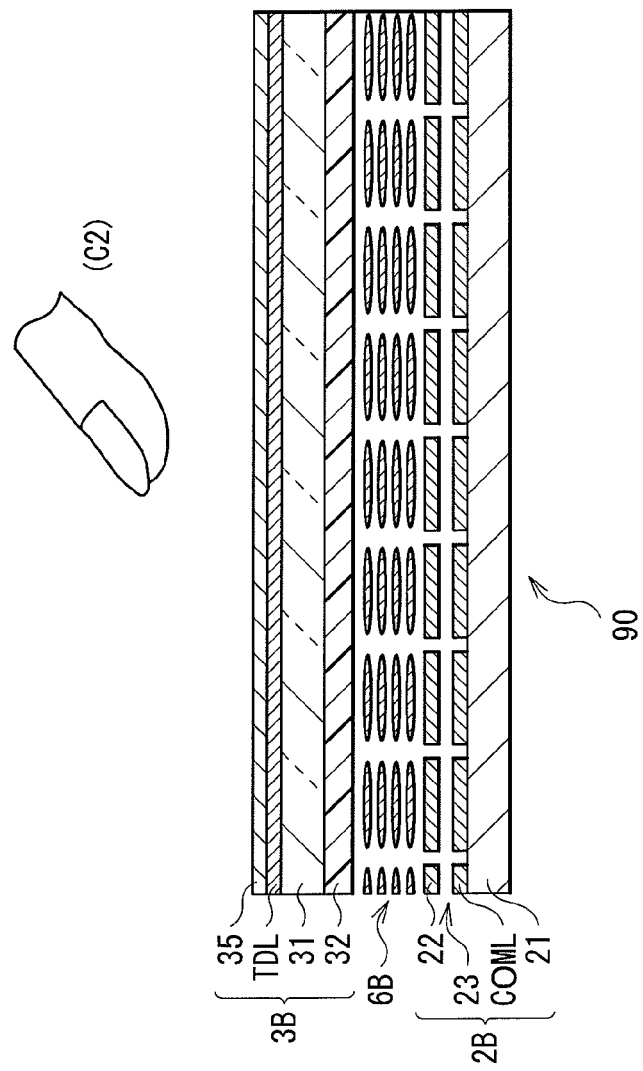
FIG. 26 is a sectional view illustrating a schematic cross-sectional configuration of a display section with a touch detection function according to another modification of the embodiment.

For example, in the above-described embodiments and the like, the display section with a touch detection function 10 is configured by integrating the touch detection section 30 and the liquid crystal display section 20 using a liquid crystal of various modes such as TN, VA, and ECB. Alternatively, the touch detection section may be integrated with a liquid crystal display section using a liquid crystal of lateral-electric-field mode such as FFS (fringe field switching) and IPS (in-plane switching). For example, in a case where a liquid crystal in the lateral-electric-field mode is used, a display section with a touch detection function 90 may be configured as illustrated in FIG. 26. FIG. 26 illustrates an example of a cross-sectional configuration of a relative part in the display section with a touch detection function 90, and illustrates a state where a liquid crystal layer 6B is sandwiched between a pixel substrate 2B and a facing substrate 3B. Since names, functions, and the like of other parts are the same as in the case of FIG. 5, the description thereof is omitted. In the example, unlike the case of FIG. 5, the drive electrodes COML commonly used for display and for touch detection are formed directly on the TFT substrate 21, and configure a part of the pixel substrate 2B. The pixel electrodes 22 are arranged above the drive electrodes COML through the insulating layer 23. In this case, all dielectric bodies including the liquid crystal layer 6B, which are arranged between the drive electrodes COML and the touch detection electrode TDL, contribute to the formation of the capacitance element C1.

For example, although in the above-described embodiments and the like, the liquid crystal display section 20 and the touch detection section 30 are integrated, this is not limitative. Alternatively, a touch detection section (a touch detection device) may be configured separately from a liquid crystal display section. In this case, in the touch detection section, the arrangement area ratio of the touch detection electrode TDL is almost equal to the arrangement area ratio of the dummy electrodes in the inter-detection-electrode region Rd so that the reflectance in respective regions are almost equal to each other. Accordingly, when the touch detection section is mounted on the display device, visibility of the display screen may be improved.

The present application contains subject matter related to that disclosed in Japanese Priority Patent Application JP 2010-186197 filed in the Japan Patent Office on Aug. 23, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalent thereof.

What is claimed is:

1. A display device with a touch detection function comprising:
 a plurality of touch detection electrodes arranged in parallel to extend in one direction, formed with a predetermined electrode pattern including an electrode portion and aperture portions, and each outputting a detection signal based on a change of an electrostatic capacitance in response to an external proximity object;
 a plurality of display elements formed in a layer different from a layer provided with the touch detection electrodes, and arranged by a predetermined number in a width direction in a region corresponding to the touch detection electrode; and
 a plurality of dummy electrodes arranged in an inter-detection-electrode region of the plurality of touch detection electrodes, wherein
 the aperture portions are provided to allow an arrangement area ratio of the touch detection electrode to be almost equal to an arrangement area ratio of the dummy electrodes in the inter-detection-electrode region, the touch detection electrode is configured of a plurality of detection electrode unit cells including the aperture portions, the inter-detection-electrode region is configured of a plurality of dummy electrode unit cells including the dummy electrode, the detection electrode unit cell and the dummy electrode unit cell are arranged in positions corresponding to the individual display elements, the display element configures a display pixel including at least a red display element, a green display element, and a blue display element, the size of the dummy electrode unit cell corresponds to the size of the display pixel or an integral multiple of the size of the display pixel, and the dummy electrode is arranged so that, out of gaps between the adjacent dummy electrodes, a gap extending in a direction intersecting with an arrangement direction of the red display element, the green display element, and the blue display element is located in a position corresponding to the blue display element, wherein the arrangement direction is a direction in which the red display element, the green display element, and the blue display element are arranged in order, and is a direction being parallel to a direction in which scanning gate lines are extending.

2. A display device with a touch detection function comprising:

a plurality of touch detection electrodes arranged in parallel to extend in one direction, formed with a predetermined electrode pattern including an electrode portion and aperture portions, and each outputting a detection signal based on a change of an electrostatic capacitance in response to an external proximity object;

a plurality of display elements arranged by a predetermined number in a width direction in a region corresponding to the touch detection electrode; and a plurality of dummy electrodes arranged in an inter-detection-electrode region of the plurality of touch detection electrodes, wherein the aperture portions are provided to allow an arrangement area ratio of the touch detection electrode to be almost equal to an arrangement area ratio of the dummy electrodes in the inter-detection-electrode region, and the dummy electrode is arranged so that, out of gaps between the adjacent dummy electrodes, a gap extending in a direction intersecting with an arrangement direction of the red display element, the green display element, and the blue display element is located in a position corresponding to the blue display element, wherein the arrangement direction is a direction in which the red display element, the green display element, and the blue display element are arranged in order, and is a direction being parallel to a direction in which scanning gate lines are extending.

3. A display device with a touch detection function comprising:

a plurality of touch detection electrodes arranged in parallel to extend in one direction, formed with a predetermined electrode pattern including an electrode portion and aperture portions, and each outputting a detection signal based on a change of an electrostatic capacitance in response to an external proximity object;

a plurality of display elements arranged by a predetermined number in a width direction in a region corresponding to the touch detection electrode; and a plurality of dummy electrodes arranged in an inter-detection-electrode region of the plurality of touch detection electrodes, wherein the aperture portions are provided to allow an arrangement area ratio of the touch detection electrode to be almost equal to an arrangement area ratio of the dummy electrodes in the inter-detection-electrode region, the touch detection electrode is configured of a plurality of detection electrode unit cells including the aperture portions, the inter-detection-electrode region is configured of a plurality of dummy electrode unit cells including the dummy electrode, the detection electrode unit cell and the dummy electrode unit cell are arranged in positions corresponding to the individual display elements, the display element configures a display pixel including at least a red display element, a green display element, and a blue display element, the size of the dummy electrode unit cell corresponds to the size of the display pixel or an integral multiple of the size of the display pixel, and the dummy electrode is arranged so that, out of gaps between the adjacent dummy electrodes, a gap extending in a direction intersecting with an arrangement direction of the red display element, the green display element, and the blue display element is located in a position corresponding to the blue display element, wherein the arrangement direction is a direction in which the red display element, the green display element, and the blue display element are arranged in order, and is a direction being parallel to a direction in which scanning gate lines are extending.

* * * * *